United States Patent [19]

Michalik

[11] Patent Number: 4,519,692
[45] Date of Patent: May 28, 1985

[54] EXPOSURE AND CAMERA CONTROL

[75] Inventor: John K. Michalik, Sloan, N.Y.

[73] Assignee: Warner-Lambert Technologies, Inc., Southbridge, Mass.

[21] Appl. No.: 483,455

[22] Filed: Apr. 8, 1983

[51] Int. Cl.³ ............................................. G03B 7/093
[52] U.S. Cl. .................................... 354/412; 354/458; 354/79; 354/217
[58] Field of Search ................. 354/458, 463, 477, 62, 354/63, 79, 105, 106, 109, 217, 412

[56] References Cited

U.S. PATENT DOCUMENTS

| 3,871,005 | 3/1975 | Uchida et al. | 354/477 |
| 4,217,046 | 8/1980 | Weinstein et al. | 354/106 |
| 4,299,466 | 11/1981 | Harvey | 354/217 |
| 4,317,623 | 3/1982 | Nobusawa | 354/463 |
| 4,339,187 | 7/1982 | Matsuura et al. | 354/79 |
| 4,343,300 | 8/1982 | Hattori | 354/62 |
| 4,363,541 | 12/1982 | Aihara et al. | 354/458 |
| 4,384,771 | 5/1983 | Sakurada et al. | 354/105 |
| 4,449,805 | 5/1984 | Sakurada et al. | 354/105 |

Primary Examiner—Russell E. Adams
Attorney, Agent, or Firm—Alan H. Spencer; Stephen Raines

[57] ABSTRACT

An exposure and camera control system comprising a keyboard for providing input information relating to film parameters and camera type, a light to frequency converter for providing signals having a frequency proportional to the intensity of light to be used in exposing the film, and a control operatively connected to the information providing keyboard and to the light to frequency converter for determining the film exposure time and for providing signals for controlling film exposure to light and signals for controlling film transport when the exposure is complete. The control includes a microprocessor, programmable memory, and input-/output interface components. A display operatively connected to the control provides visual display of information inputs to the control and of calculated quantitites such as exposure time. A printer operatively connected to the control provides a hard copy record of the displayed information. A light detector operatively connected to the control includes a mirror normally positioned in the optical path for directing light to the light to frequency converter which mirror is moved out of the optical path before an exposure is made. Sensors in the camera being controlled provide signals to the control indicative of film travel and presence of a new film roll in the camera. The exposure and camera control has advantageous use with a microscope in apparatus for making photomicrographs.

15 Claims, 24 Drawing Figures

EXPOSURE AND CAMERA CONTROL

BACKGROUND OF THE INVENTION

This invention relates to the art of photographic apparatus, and more particularly to a new and improved exposure and camera control.

One area of use of the present invention is controlling a camera used with a microscope for making photomicrographs, although the principals of the present invention may be variously applied. It would be particularly desirable to provide an exposure and camera control of the digital type with the advantages of digital information processing. It also would be highly desirable to monitor the light level for determining exposure time in such a control in a manner which makes available all the usable light for ultimately exposing the film. Furthermore, it would be advantageous to provide the control with capability of using a light detector with relatively broad spectrol response. In contrast to exposure and camera controls heretofore available, it would be extremely useful and beneficial to provide instantaneous, visual display of information inputs to the control and calculated quantities such as exposure time, a hard copy print out of the displayed information, and automatic frame-to-frame advance of the film in the camera.

SUMMARY OF THE INVENTION

It is, therefore, a primary object of this invention to provide a new and improved exposure and camera control.

It is a more particular object of this invention to provide such an exposure and camera control which employs digital information processing techniques.

It is a further object of this invention to provide such exposure and camera control wherein the light intensity is monitored or sampled in a way which makes available all of the usable light for ultimately exposing the film.

It is a further object of this invention to provide such an exposure and camera control capable of using a light detector having a relatively broad spectral response.

It is a further object of this invention to provide such an exposure and camera control including instantaneous visual display of information to the control and calculated quantities such as exposure time together with hard copy print-out of the displayed information.

It is a further object of this invention to provide such an exposure and camera control including automatic frame-to-frame advance of film in the camera and monitoring the presence of a new film roll in the camera.

The present invention provides an exposure and camera control system comprising means for providing input information relating to film parameters and camera type, light to frequency converter means for providing signals having a frequency proportional to the intensity of light to be used in exposing the film, and control means operatively connected to the information providing means and to the light to frequency converter means for determining the film exposure time and for providing signals for controlling film exposure to light and signals for controlling film transport when the exposure is complete. The control means includes digital information processing means, storage means and input/output interface means. A display means operatively connected to the control means provides visual display of information inputs to the control and of calculated quantities such as exposure time. A printer operatively connected to the control means provides a hard copy record of the displayed information. A light detector means operatively connected to the control means includes a mirror normally positioned in the optical path for directing light to the light to frequency converter means which mirror is moved out of the optical path before an exposure is made. Sensing means in the camera being controlled provides signals to the control means indicative of film travel and presence of a new film roll in the camera. The exposure and camera control has advantageous use with a microscope in apparatus for making photomicrographs.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

The exposure and camera control according to the present invention controls film exposure to light and controls film transport in the camera when the exposure is complete. The exposure is determined by first inputing information by means of a keyboard which information is displayed in digital form. The parameters which are needed are film speed in ASA or DIN form, reciprocity scale number, and a camera type, i.e. a format number The control then calculates an exposure time by indirectly measuring the light level which has been converted to a proportional frequency. The control has the capability of storing, even with system power off, the film parameters for several cameras. The camera types, for example, can be four in number including two types of 35 mm camera, a $3\frac{1}{4} \times 4\frac{1}{4}$ instant camera, and a $4 \times 5$ instant camera. The film parameters are spped in ASA or DIN, reciprocity scale number, the next available exposure frame number, and the last selected format position which was used. When system power is turned on, the control will read the foregoing quantities and re-display the proper data for the camera used, it will sense if a new roll of film has been loaded into the camera, and it will then automatically advance the film in the camera to start position and display the frame position of number 1. If an external foot switch is employed for triggering the camera exposure, the system will control the exposure time and also the film advance.

When the control is used with a microscope for making photomicrographs, the control will also determine the type of microscope it is operatively connected to, and if it is connected to a manual camera selection microscope, the control will scan an input point which is connected to camera selection switches. If the camera selection is changed by the operator, the control will bring out the film data for that camera into the display and complete the exposure time based on those parameters. This allows three format selections along with three possible camera selections. An external printer can be employed for printing all important information which is contained in the display. The exposure time also can be controlled in a memorized exposure mode which fixes the time even if light variations occur. If manual selection of exposure time is desired, the operator can select such time in minutes and seconds. The control also has the capability of controlling lapse time photography whereby the operator selects the number of exposures and the time between exposures, and that information also is displayed. The control also can stop an exposure in progress or clear the control memory of the memorized exposure time or lapse time parameters.

Figure 1:
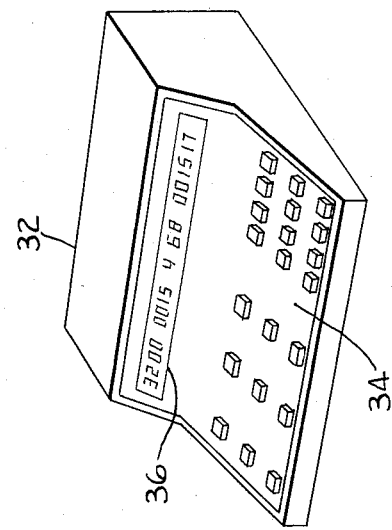
FIG. 1 is a perspective view illustrating the exposure and camera control of the present invention in apparatus for making photomicrographs.
Figure 1:
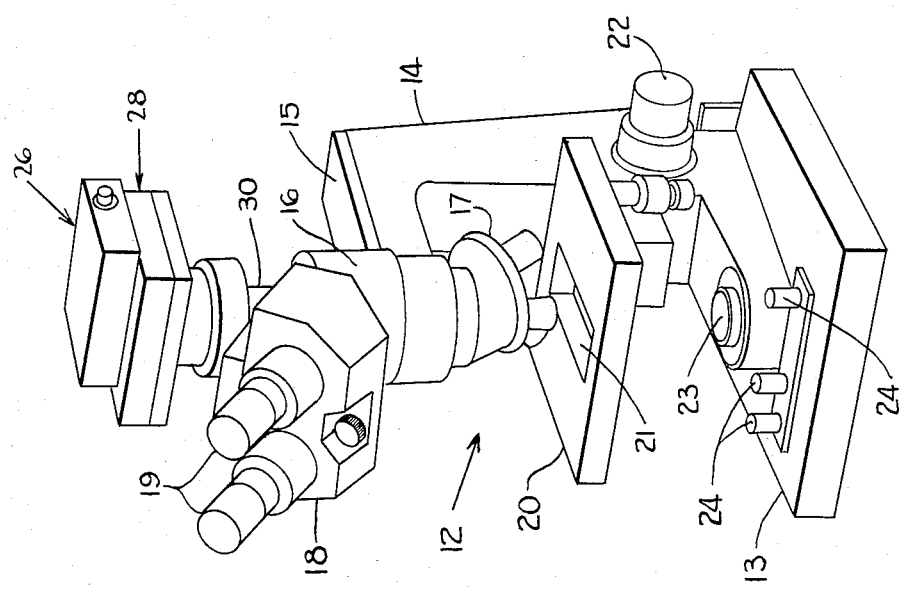

FIG. 1 illustrates the exposure and camera control according to the present invention for use with a microscope in making photomicrographs. A typical laboratory microscope generally designated 12 has a supporting base 13, and upstanding, generally vertical post 14 and an arm 15 extending from post 14 over and in space relation to base 13. An optical housing 16 is carried by arm 15, and a lens or magnification selection turret 17 is operatively connected to the lower end of housing 16 in a known manner. A housing 18 extending from optical housing 16 supports a pair of eyepiece elements 19. A microscope slide supporting table 20 having an opening 21 therein is supported on post 14 between base 13 and arm 15 in a known manner. An adjustment knob 22 is connected to post 14, a light source 23 is located on base 13 for directing light upwardly through opening 21, the selected magnifying lens and the housing 13 along the optical path of the instrument. Various control knobs 24 all extend from base 13 for various functions such as selecting light intensity.

For making photomicrographs, a camera generally designated 26 is operatively connected to microscope 12 through a shutter and light detector combination 28 which will be described in further detail presently. The camera 26 and shutter and light detector 28 are operatively connected to the microscope by means of a tubular connector 30 which extends from assembly 28 and is connected at the opposite end in the microscope trinocular body. For a more detailed description of the setup, installation, and use of a camera and microscope combination for making photomicrographs, reference may be made to *Reference Manual, Photomicrographic Cameras Models* 1052F, 1053F, 1055F available from the Americal Optical Corporation, Scientific Instrument Division, Buffalo, N.Y., the disclosure of which is hereby incorporated by reference.

The exposure and camera control, according to the present invention, is contained within a housing 32 which also supports a keyboard generally designated 34 for inputing information into the control and also supports a display 36 for providing a visual display of that information as well as additional information which will be described in detail presently. The control within housing 32 is electrically connected to camera 26 and the shutter and light detector 28 by suitable electric conductors (not shown in FIG. 1) and, similarly, electrical power is provided to the control within housing 32 by a regulated power supply (not shown) and a conductor (not shown) for connection to a standard electrical outlet receptacle providing line voltage.

Figure 2:
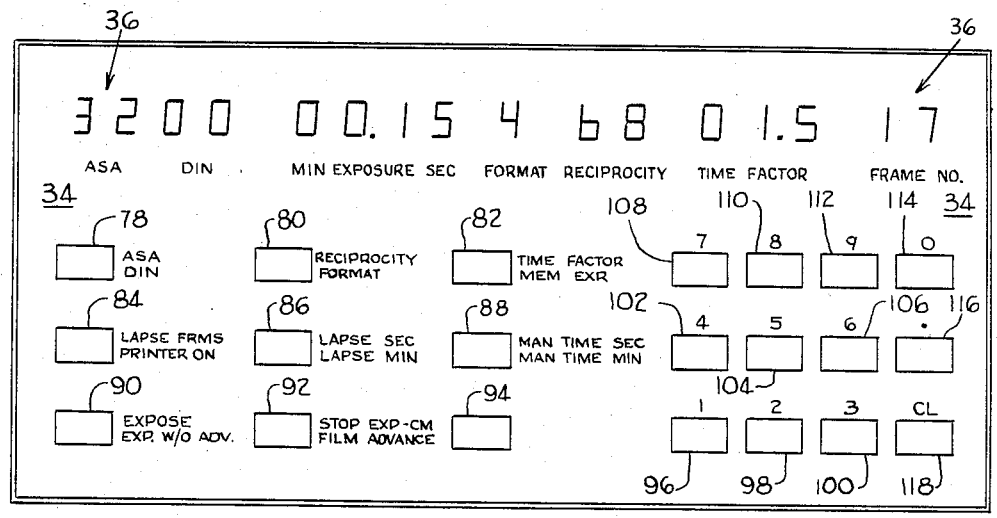
FIG. 2 is a diagrammatic view further illustrating the keyboard and display in the control of FIG. 2.
Figure 3:
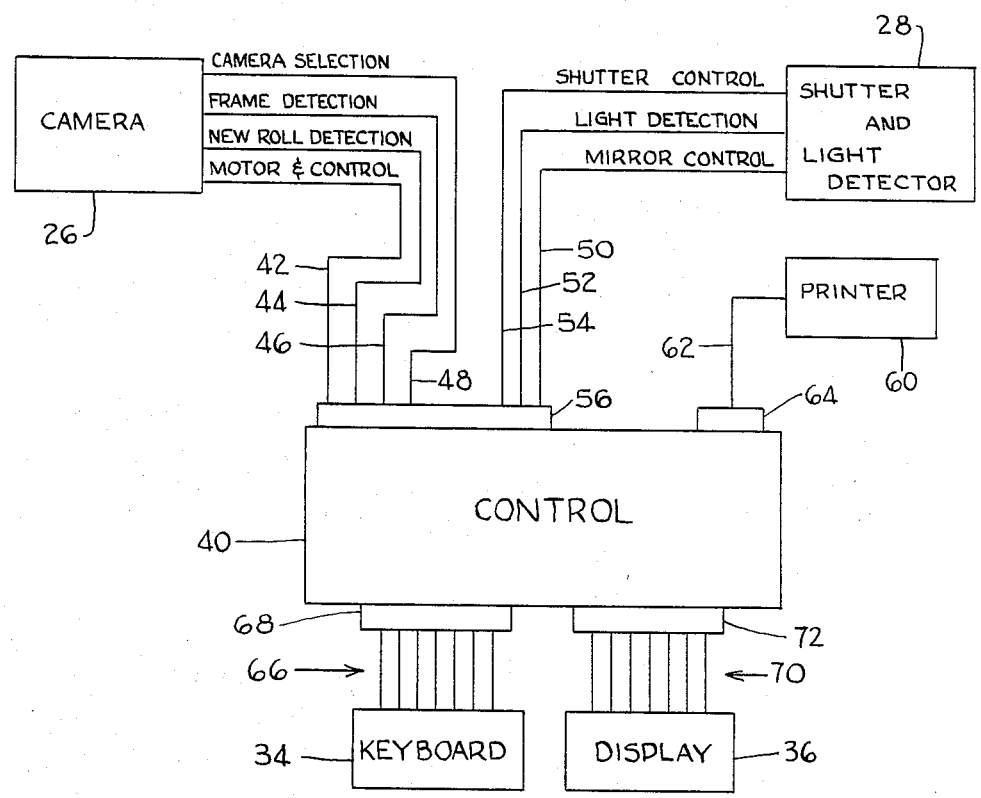
FIG. 3 is a system block diagram of the apparatus of FIG. 1.

FIG. 2 illustrates in more detail the keyboard 34 and display 36 of FIG. 1, and FIG. 3 illustrates the arrangement of and relationship among the control, camera 26, shutter and light detector 28, keyboard 34 and display 36. Referring first to FIG. 3, the control is generally designated 40 and includes digital information processing means, storage means, and associated circuits and will be described in further detail presently. FIG. 3 indicates the various control and information signals transmitted between the control 40 and camera 26 and between control 40 and shutter and light detector 28. In particular, line 42 transmits signals from control 40 to the camera motor for starting and driving the motor to cause transport or advance of the film and to stop the motor when each film frame is in position for exposure. Lines 44 and 46 convey signals from camera 26 to the control for indicating when a new roll of film is in the camera and for indicating the extent of film travel and, accordingly, when the next frame of the film is in position for exposure. Line 48 transmits signals to control 40 indicative of particular types of camera in use when the system has the capability of operating with more than one camera, in number and in kind.

Line 50 transmits signals from control 40 to the light detector for controlling the position of a light sampling mirror into and out of the optical path in a manner which will be described. Line 52 conveys signals from the light detector to the control indicative of the light intensity in a manner in which also will be described. Line 54 transmits signals from control 40 to the shutter for controlling the opening of the shutter according to a determined exposure time obtained from calculations based on light intensity in a manner which will be described. The foregoing lines all are joined to control 40 through an electrical connector designated 56. A hard copy printer 60 is connected to the control 40 through a line 62 representing a plurality of conductors and by means of an electrical connector 64 Keyboard 34 is connected to control 40 through a plurality of lines generally designated 66 and by means of an electrical connector 68, and, similarly, display 36 is connected by the group of lines designated 70 and an electrical connector 72 to the control 40.

FIG. 3 illustrates in further detail the arrangement and operation of keyboard 34 and display 36. Keyboard 34 in the apparatus shown includes nine function selection keys designated 78-94. For inputing numerical quantities, keyboard 34 also includes ten numerical information keys 96-114, along with a key 116 for providing a decimal point in the numerical quantity when needed. There is also provided a clear key 118 for use in a known manner.

Considering in detail the function keys 78-94, as shown in FIG. 3, each of the keys 78-92 has two indicated functions associated therewith, and when any one particular key is depressed, the particular one of the two functions selected is determined by the state of a mode selection key 94. For example, in an illustrative apparatus, the funtions identified by the indicia on the upper of the two lines near each key are selected by that corresponding key when the mode selection key 94 is in a rest or initial position, i.e. not depressed. Accordingly, when key 94 is depressed along with a particular function key, the lower identified function associated with that key is selected. Key 78 is for entry of the film speed number either according ASA or DIN format, depending upon the state of mode selection key 94, and the particular film speed number, after depression of key 78 is entered by depressing the appropriate numbered keys 96-114. For example, film speed in ASA can be from 8 to 6400 and in DIN can be from 10 to 39. Key 80 is for entry of format and reciprocity, again depending on the state of key 94. Format is a number, for example from one to four, selected according to the type of camera being controlled. By way of example, format one could be for a 35 mm camera at low magnification (2.8×), format two for a 35 mm camera high magnification (5.0×), format three for a 3¼×4¼ instant camera with 8.0× magnification and format four can be for a 4×5 camera with 10.0 magnification. The other function selected by key 80, i.e. reciprocity, is a correction factor determined from film failure rate and obtained from the manufacturer of the film being used. Reciprocity correction is provided with selection of nine different compensating curves with increasing correction to 10× linear exposure value. Using a table or curve for the film selected, the reciprocity number is inputed using the keys 96-114.

Turning now to key 82, the one function is memorized exposure and when selected the metered exposure value is placed in the control memory and stored there until the exposure is made. This is used, for example, in a situation where the object to be photographed is laterally spaced out of the light intensity sensing area thereby precluding a true reading of the light. Accordingly, the operator physically moves the object into the sensing area, the system is operated to sense the light level, the control memorizes the factor, and then the operator moves the object back and the system uses the memorized value for computing the exposure time. The other function selected by key 82, the time factor, is used to produce a lighter or darker picture by multiplying the metered exposure value by an external time factor different from one, i.e. in an illustrative system in a range from 0.1 to 20. The lower function selected by key 84, identified as printer on, causes the data presented in the display 36 to be printed out in hard copy form. Thus, when the exposure button 90 is depressed the display data is transmitted through the path 62 in FIG. 2 to the printer 60.

The other function selected by key 84, identified as lapse frames, together with the functions selected by key 86, are used in conjunction with a 35 mm automatic camera enabling automatic picture taking by entering the number of frames wanted and then the desired lapse time between the frames. In particular, key 84 is depressed, and the number of lapse frames is selected, for example 2-75, and entered by means of the numbered keys 96-114, whereupon the time between frames is entered using key 86 in conjunction with key 94 depending upon whether the time is in minutes or seconds followed by entering the appropriate number by means of keys 96-114.

While it is a feature of the control to automatically calculate and effect the exposure time, depending upon the light level measured, the system has the capability of allowing for manual entry of a particular exposure time. This is accomplished using key 88 in conjunction with key 94 depending upon whether the exposure time is to be in minutes or seconds, along with entry of the numerical value of the exposure time by means of keys 96-114. When the system is in this mode the display 36 indicates the selected exposure time. The system is returned to the metered exposure mode when thestop exposure—clear memory function is selected by key 92.

Key 90 selects the expose function, in the other mode the exposure without advance enables the taking of multiple exposures The film advance function selected by key 92 is for taking multiple film advances without exposures, and the stop exposure—clear memory function selection by key 92 is for returning to the metered exposure mode as previously described. Thus, the stop exposure—clear memory function serves the dual purpose of stopping an exposure in progress or clearing the memory of the memorized exposure time or lapse time parameters.

FIG. 2 also indicates illustrative quantities in the display 36 in a typical operation of the apparatus. Thus, the film speed displayed is 3200 and the exposure time is 0.15 sec. The selected format is four, the reciprocity correction factor 68 and the time factor is 1.5. The display also indicates that the seventeenth frame is being exposed on the film presently in the camera.

By way of illustration, the operation of the system of the present invention will be described in the making of photomicrographs. A microscope, such as the microscope 12 shown in FIG. 1, is set up in a known manner. The camera 26 and shutter and light detector 28 combination are connected to the microscope trinocular body as previously described. The electrical connections between camera 26, shutter and light detector 28 and the housing 32 are made as previously described and illustrated in FIG. 2. The system provides for automatic film advance by means of a motor in camera 26 as will be described in detail presently, and the film is rewound manually. An electronic memory stores the film frame number for display as previously described. This memory has a battery backup so that the power can be disconnected or the camera can be removed from microscope. When a new roll of film is loaded in the camera, requiring the camera back to be open, the memory is reset to 0 as will be described. Then when the camera is attached to microscope 12 and the exposure control, the frame number displayed will be random when the expose button 90 is first pressed, the camera 26 will automatically advance three frames and the frame number displayed and the camera memory will be updated to number 1. The camera memory and display number will be updated by the control after every exposure up to a predetermined total such as 75. The film advance is controlled by counting pulses from camera 26 in a manner which will be described.

For the particular photographic procedure employed, the appropriate information is entered using buttons 96–116 corresponding to functions selected by buttons 78–94. In particular, when the function keys 78–92 are pressed the system waits for the number keys 96–116 to be depressed to provide numerical data for the selected function. As the number keys are depressed the information is entered into the control and also displayed on the display 36. The system provides for rejection of data after a time delay of greater than four seconds between depression of a function key and depression of a number key.

The film speed is entered in either ASA or DIN form as previously described. Next the format is entered as previously described. The system can have the capability of automatic format selection for particular types of microscopes if desired. Next the reciprocity for the film selected is entered using the appropriate table.

Next, the light is directed from the source 23 on microscope 12 to the shutter and light detector combination 28. A photo detector, in conjunction with an electronic circuit, converts the light into a frequency which the control utilizes to compute an exposure time. This exposure time then is displayed and it can be evaluated by the operator The operator can increase or decrease the light as desired and insert proper color correction filters. If the camera has a dark slide it is opened and then the expose button 90 is depressed. This causes operations of a solonoid and shutter in the shutter to move the light sampling mirror out of the film and open the shutter to the correct exposure in a manner which will be described.

The foregoing describes the basic operation of the system. Various additional features can be utilized, for example entry of a manual entry exposure time using key 88 and can be terminated when desired using key 92 as previously described. The exposure value can be stored in memory using the memorized exposure function by key 82 as previously described. Lapse time photography can be employed as selected by keys 84 and 86. A print out of displayed data can be provided and multiple exposures can be made as previously described.

Figure 4:
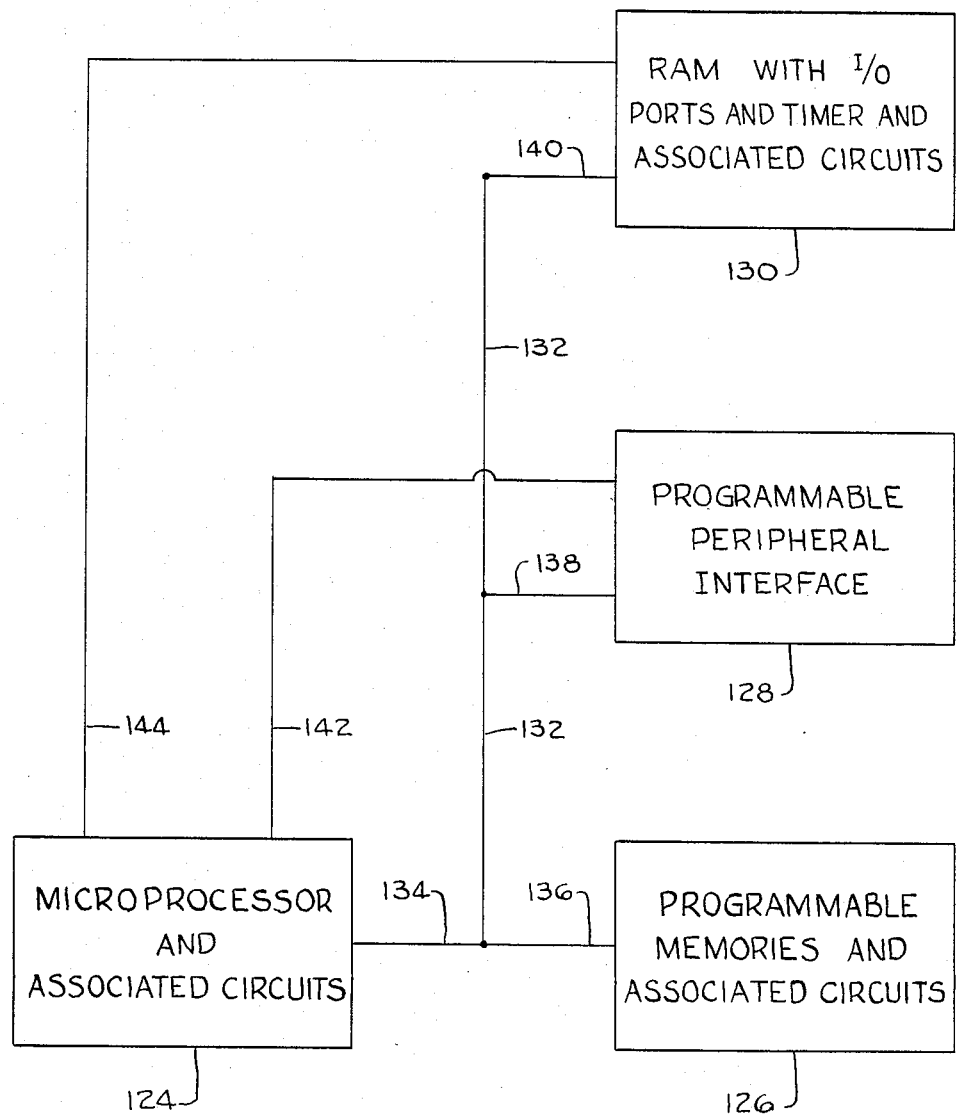
FIG. 4 is a block diagram of the control portion of the system of FIG. 3.

FIG. 4 is a block diagram illustrating in further detail the control 40 of FIG. 3. Control 40 includes digital information processing means, storage means and input/output interface means. In particular, control 40 includes a microprocessor and associated circuits 124 which serves as a central processor for the control system in a manner which will be described. There is also provided means for storing the program which controls operation of system and the storage means comprises a plurality of programmable memories, for example three, and associated circuits designated 126 which will be described presently. The system also includes means for providing an input/output interface between the control 40 and the camera 26, shutter and light detector 28, keyboard 34, display 36 and printer 60. In particular the input/output interface means includes a programmable peripheral interface generally designated 128 and a random access memory with input/output parts and timer and associated circuits 130 both of which will be described presently. The microprocessor 124, PROMS 126, and input/output interfaces 128, 130 are interconnected by a bus generally designated 132 in FIG. 4.

Branch paths providing connections between bus 132 and microprocessor 124 and PROMS 126 are designated 134 and 136, respectively in FIG. 4. Similarly, the programmable peripheral interface 128 and the RAM with I/O ports and timer 130 are connected to bus 132 by branches 138 and 140, respectively. Also, lines 142 and 144 in FIG. 4 represent additional paths between microprocessor 124 and the components 128 and 130 as shown.

Figure 5:
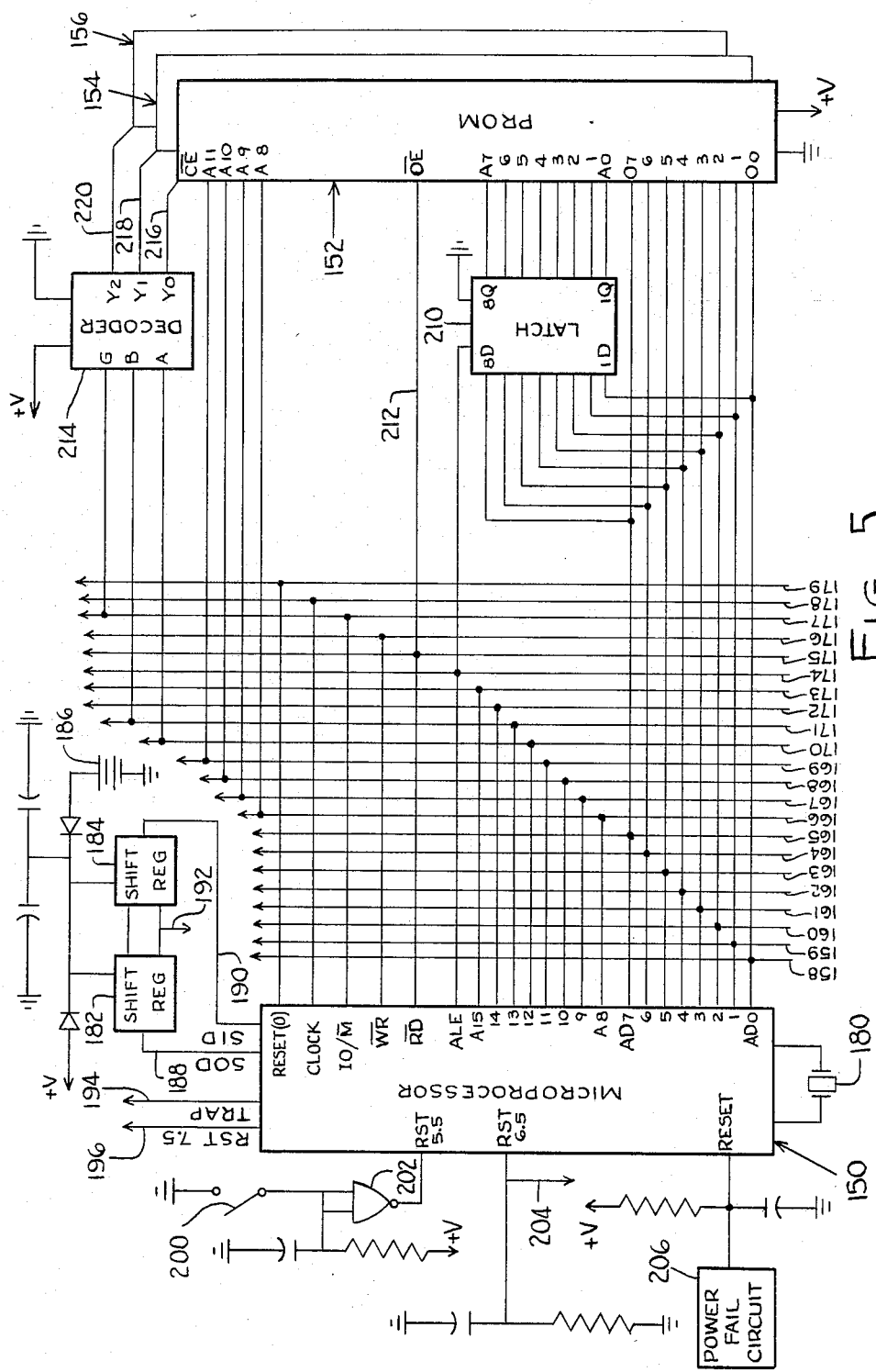
FIG. 5 is a schematic circuit diagram of the microprocessor and associate circuits and the programmable memory and associated circuits in the control of FIG. 4.

FIG. 5 illustrates in further detail the portion of the arrangement of FIG. 4 including the microprocessor and associated circuits 124 and the PROMS and associated circuits 126. In particular, there is provided a microprocessor 150, and by way of example, in an illustrative system, microprocessor 150 is an Intel 8085AH 8-bit HMS microprocessor. There are also three PROMS 152, 154 and 156 which will be described in further detail presently. Lines 158–179 in FIG. 5 represent the conductors of bus 132 shown in FIG. 4.

Turning now to microprocessor 150, the standard clock frequency, in the present instance 6 Mhz, is provided by a frequency source or oscillator 180 which is connected to pin numbers 1 and 2 of the Intel 8085 microprocessor. Internally, the microprocessor 150 runs at one half the standard frequency or 3 Mhz, and this frequency is provided at the output designated CLOCK which is pin number 37 of the Intel 8085. The eight address/data parts designated AD0–AD7 comprise the multiplex bus where all communication to and from the micropressor is established. These are pin numbers 12–19 of the Intel 8085 microprocessor and are connected to bus lines 158–165, respectively as shown in FIG. 5. The eight high order address ports designated A8–A15 are used to access the Proms 152, 154, 156 or memory map addresses. These are pin numbers 21–28 on the Intel 8085 and are connected to bus lines 166–173, respectively as shown in FIG. 5. The ports designated ALE, $\overline{RD}$, $\overline{WR}$, IO/$\overline{M}$, CLOCK and RESET(O) are connected to bus lines 174–179, respectively, as shown in FIG. 5.

Associated with microprocessor 150 is a backup memory comprising shift registers 182 and 184 which derive power either from the system +V logic supply, for example +5 volts, when the system power is on or from battery 186, which can be a lithium battery, when the system power is off. Lines 188 and 190, also designated SOD and SID respectively, are employed to input and output the serial data stored in the backup memory. This is all data specific to the film types in use by the system. In particular, line 188 is connected to the input of register 182, and line 190 is connected to the output of register 184. The lines SOD and SID are pin numbers 4 and 5 on the Intel 8085 microprocessor. Clock pulses for the shift registers 182, 184 are obtained from the programmable peripheral interface 128 of FIG. 4 by line 192 in a manner which will be described.

Microprocessor 150 is run on a priority basis and all the interrupt keys are used. These are designated TRAP, RST 7.5, RST 6.5 and RST 5.5 in FIG. 5 which correspond to pin numbers 6–9 on the Intel 8085 processor. TRAP has the highest interrupt priority with the input thereof coming over line 194 from a timer in the RAM with I/O ports and timer 130 of FIG. 4. The repetition rate is 1000 times per second and cannot be masked out. The incoming pulses can be stopped by either stopping the internal timer in the component 130 or stopping pulses applied to a particular part in component 130 as will be described. RST 7.5 has the next highest priority and is connected by line 196 to a light to frequency converter circuit in a manner which will be described. Pulses applied through this pin enable the microprocessor to measure the period when interrupt is unmasked. RST 6.5 has the next highest priority and is connected by line 204 to the camera 26 in a manner which will be described. The signal level on line 204 indicates whether or not a new roll of film has been placed in the camera. The final interrupt RST 5.5 has the lowest priority and is connected to a foot switch designated 200 through a gate 202 and associated circuitry. When switch 200 is pressed the exposure routine is called.

The RESET port is connected to the system +V logic supply as shown in FIG. 5 and this starts the microprocessor 190 in a known condition upon power up. Also, upon power down, a power fail circuit 206 will sense an impending power cut off and will reset the microprocessor 150. This places all the components in a known condition and will shut down the system orderly and preserve the backup memory. The power fail circuit 206 has an input connected to the power supply line leading to the input of a standard bridge rectifier, and the circuit includes a diode having an anode connected to the circuit input and a cathode connected to the positive terminal of a one microfarad capacitor, the other terminal which is connected to ground. An 18K resistor is connected across the capacitor, and the circuit further includes a PNP transistor, the emitter of which is connected to the circut output and hence the microprocessor RESET part, and the collector of which is connected to ground. The base of the transistor is connected through a 100K resistor to the junction of the aforementioned capacitor and resistor.

As shown in FIG. 5, there are three PROMS, and by way of example, in an illustrative system, each PROM is an Intel 2732A 32K (4K×8) UV erasable PROM. In the arrangement shown all lines are connected in parallel except for the parts designated $\overline{CE}$ as will be described. Associated with the PROMS is a latch 210, and the low order address ports A0–A7 are connected to latch 210. The port $\overline{OE}$ is connected by line 212 to the bus line 175 as shown in FIG. 5 which is also connected to port $\overline{RD}$ of microprocessor 150. The high order address ports A8–A11 are connected to bus lines 166–169. A decoder 214 also is associated with the PROMS, and the A, B and G inputs are connected to bus lines 170, 171 and 177, respectively. The ports $\overline{CE}$ of each PROM 152, 154 and 156 are connected by lines 216, 218 and 220, respectively, to the outputs Y0, Y1 and Y2 of decoder 214.

The main program for the system is contained in the PROMS 152, 154 and 156 and the microprocessor upon program execution will output an address. If this address falls within a valid location, one of the PROMS 152, 154 or 156 will be selected by the decoder 214. The low order address lines A0–A7 are latched by the latch 210 during the instruction fetch cycle. The outputs 1D–8D of latch 210 are connected to the lines connecting the outputs 00–07 to the bus lines 158–165, respectively. If one of the PROMS is selected, its contents will be sent back when $\overline{RD}$ from the microprocessor becomes active.

Figure 6:
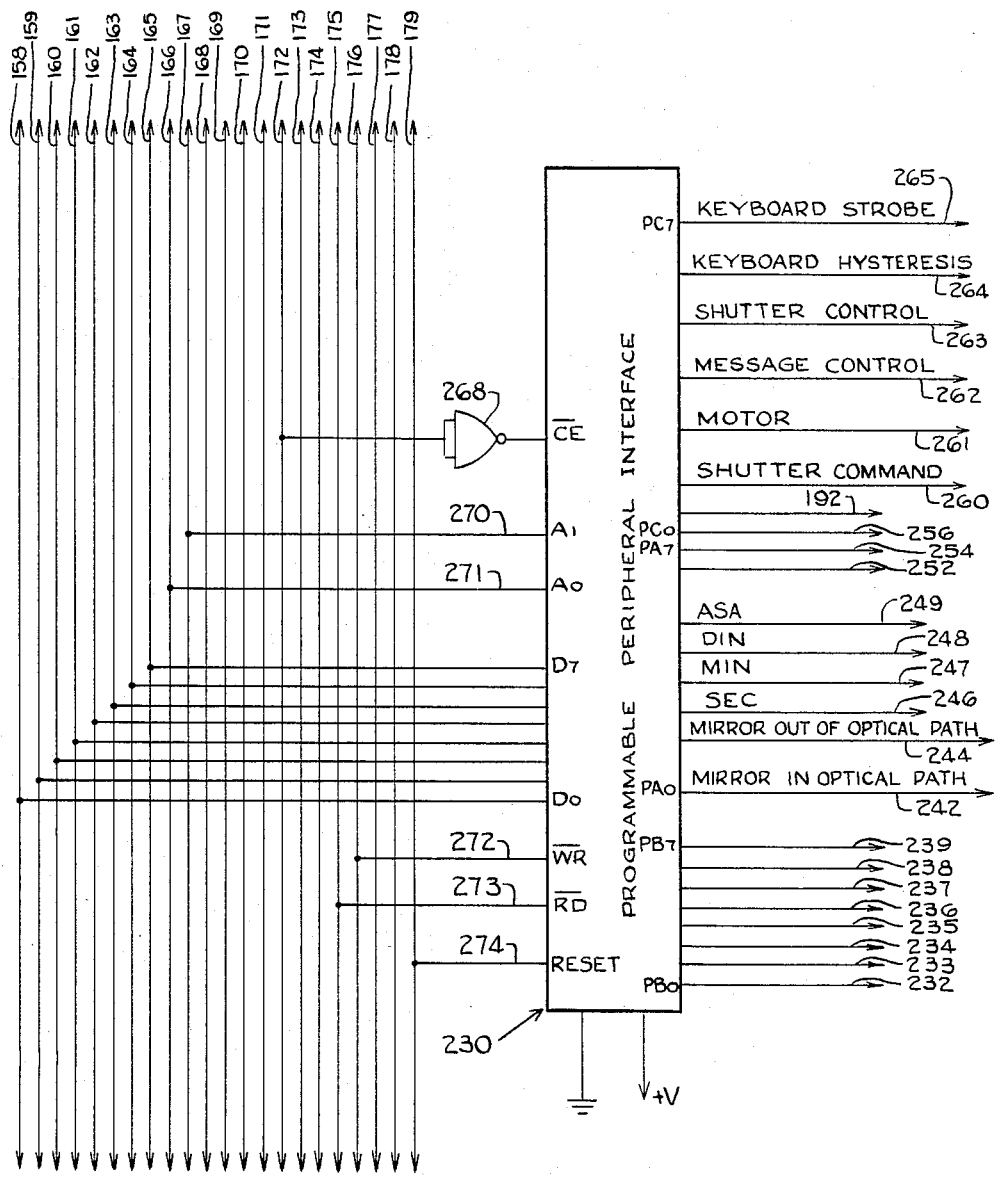
FIG. 6 is a schematic circuit diagram of the programmable peripheral interface in the control of FIG. 4.

FIG. 6 shows in further detail the programmable peripheral interface 128 of FIG. 4, and by way of example in an illustrative system, a programmable peripheral interface 230 which can be employed is an Intel 8255A programmable peripheral interface ports PB0–PB7 which comprise pin numbers 18–25 on the Intel 8255 interface are connected by lines 232–239 shown in FIG. 6 to the printer 60. In particular, lines 232–238 are coupled to the printer output bits numbered 0–6, and line 239 transmits a printer strobe signal. In the next group of ports PA0–PA7, ports PA0 and PA1 are connected by lines 242 and 244, respectively, to a solenoid for moving a mirror into and out of the optical path in conjunction with operation of the light detector in a manner which will be described. These are pin numbers 4 and 3, respectively, on the Intel 8255 interface. Ports PA2–PA5 are connected by lines 246–249, respectively, to indicator lamps of display 36. These correspond to pin numbers 2, 1, 40 and 39, respectively, on the Intel 8255 interface. The indicator lamps can be in the form of light emitting diodes positioned to back light indicia on the display. In particular, lines 246, 247, 248 and 249 are connected to light emitting diodes to illuminate the quantities SEC, MIN, DIN, and ASA, respectively, on display 36 as shown, for example, in FIG. 2. Those are quantities which require selection for illumination during operation of the system, whereas the reamining indicia on display 36 shown in FIG. 2 are illuminated continuously and therefore do not require selection. The remaining ports PA6 and PA7 of the group, which correspond to pin numbers 38 and 37, respectively, of the Intel 8255 interface, are connected by lines 252 and 254 to a flip-flop which controls the input to a timer in the RAM of component 130 of FIG. 4 in a manner which will be described.

The third group of ports PC0–PC7 corresponding to pin numbers 14–17, 13, 12, 11 and 10, respectively, on the Intel 8255 interface are used in a set-reset mode to simplify programming techniques to control the processes. Port PC0 is connected by line 256 to the light detector to select a high or low frequency mode in a manner which will be described. Port PC1 is connected by line 192 to shift registers 182, 184 as previously described to provide clock signals for the backup memory. Port PC2 provides a signal on line 260 to the shutter solenoid for selecting a reduced level of electrical power for operating the shutter solenoid. Port PC3 provides a signal on line 261 to control the advance or braking of the camera motor. In particular, line 261 is connected to the input of an inverter, the output of which is connected to a line providing a braking command signal and also is connected to another inverter, the output of which provides a motor advance command signal. Thus, depending on whether the signal on line 261 is high or low, a motor advance command or motor braking command will result. Port PC4 provides a signal on line 262 to select the message mode for display 36 in a manner which will be described. Port PC5 provides a signal on line 263 which energizes a solenoid to open the shutter. Ports PC6 and PC7 provide keyboard control signals designated HYSTERESIS and STROBE on lines 264 and 265, respectively. Each of the lines 242, 244, 260 and 263 is coupled through a power switching circuit to the mirror solenoid, motor, or shutter solenoid. In each instance the switching circuit comprises an inverter having an input connected to the appropriate one of the lines 242, 244, 260 and 263 and an output connected to the base of a power transistor, the collector-emitter path of which is in series with a load, i.e. the mirror solenoid, camera motor or shutter solenoid.

The remaining inputs to the programmable peripheral interface 230 are connected to the bus conductors as shown in FIG. 6. Bus line 172 is connected through gate 268 to the port $\overline{CE}$. Bus lines 166 and 167 are connected by lines 271 and 270, respectively, to ports A0-A1. Bus lines 158-165 are connected to data input ports D0-D7. Bus lines 176, 175 and 179 are connected through lines 272, 273 and 274 to the ports $\overline{WR}$, $\overline{RD}$, and RESET.

Figure 7:
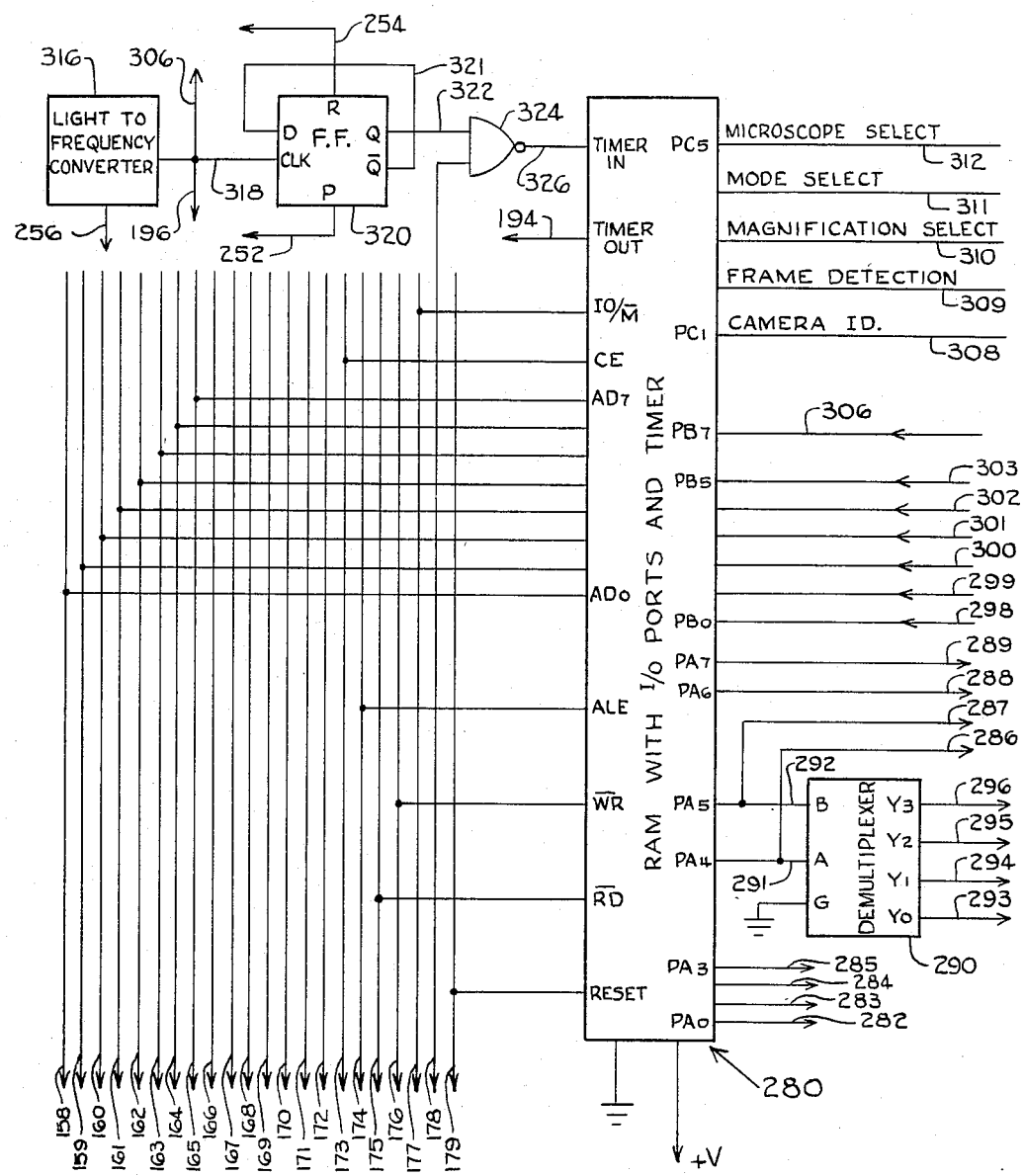
FIG. 7 is schematic circuit diagram of the RAM with I/O ports and timer associated circuits in the control of FIG. 4.

FIG. 7 shows in further detail the RAM with I/O ports and Timer and associated circuits 130 of FIG. 4. In particular there is provided a RAM with I/O ports and Timer 280, and by way of example, in an illustrative system, the component 280 is an Intel Model 8156H 2048 Bit Static HMOS RAM with I/O ports and Timer. Component 280 is a multiple use component, as it contains input-output pins, 256 bytes of read-write memory and a programmable 14 bit timer. Ports PA0-PA7 corresponding to pins 21-28 on the Intel 8156H device, are outputs containing display data sent by lines 282-289 to display 236. The lower order ports PA0-PA3 contain the binary coded decimal representation corresponding to bit numbers 0-3, respectively, and the higher order ports PA4-PA7 contain information on the digit position corresponding to bit numbers 0-3. A demultiplexer 290 is provided for selecting columns on keyboard 34. The A and B inputs of demultiplexer 290 are connected by lines 291 and 292 to the ports PA4 and PA5 which are the first two address pins. The Y0-Y3 outputs of the multiplexer 290 are connected by the lines 293-296, respectively, to the keyboard with the lines 293-296 corresponding to bit numbers 0-3 associated with the keyboard column.

Ports PB0-PB5 corresponding to pins 29-34 on the Intel 8156 device are connected by lines 298-303 to keyboard 34 to receive data therefrom. Lines 298-303 correspond to return bit numbers 0-5. Port PB7, corresponding to pin 36 on the Intel 8156 device, is connected by line 306 to the light detector, in particular to the light to frequency converter therein, for determining if the converter is saturated in which case a low level signal is present on line 306. Port PC1, corresponding to pin 38 on the Intel 8156 device, is connected by line 308 to a circuit for indicating the type of camera employed. This circuit can provide a high or low level indicating different camera types in a manner which will be described. Port PC2, corresponding to pin 39 on the Intel 8156 device, is connected by line 309 to the camera 26 to receive pulses generated during film advance for monitoring same in a manner which will be described. Port PC3, corresponding to pin 1 on the Intel 8156 device, is connected by line 310 to an appropriate circuit for indicating the particular magnification selected on a particular microscope. Port PC4, which is pin 2 on the Intel 8156 device, is connected by a line 311 to an appropriate circuit for indicating types of films selected, for example 35 mm or instant film. Port PC5, corresponding to pin 5 on the Intel 8156 device, is connected by a line 312 to an appropriate circuit for indicating whether a particular microscope is being used. When the system power is turned on, the microprocessor 150 looks at port PC5 of component 280 and either causes the system to configure itself for that particular microscope or to ignore the ports PC3, PC4 and PC5 of the device 280.

Associated with device 280 is a light to frequency converter circuit generally designated 316 which is part of the light detector in component 28 and comprises, briefly, a photocell and analog to digital converter for providing output pulses proportional to light intensity. The A/D converter can comprise a National Semiconductor LM331 voltage to frequency converter with an integrator in the feedback loop, the integrator comprising an operational amplifier and feedback capacitor. A mirror normally positioned in the optical path directs light to the photocell, and when a camera exposure is to occur the mirror is moved out of the optical path in a manner which will be described. The light to frequency converter 316 also includes a range selection feature to provide system capability of low light levels, which normally would provide low frequency pulses. This is controlled by a signal on line 256 from the programmable peripheral interface 230 of FIG. 6 as previously described. For a more detailed description of a perferred form of light to frequency converter 316, reference may be made to pending U.S. patent application Ser. No. 483,408, filed Apr. 9, 1983 * entitled "Current to Frequency Converter" and assigned to the assigneee of the present invention, incorporated hereinby reference.

* executed Apr. 7, 1983—Warner Lambert Technologies

The output of light to frequency converter 316 is connected by a line 318 to the clock input of a flip-flop 320. The P and R inputs of flip-flop 320 are connected by lines 252 and 254 to the programmable peripheral interface 230 of FIG. 6 as previously described. The complement output of flip-flop is 320 is connected by line 321 to the D input thereof. The true output of flip-flop 320 is connected by a line 322 to one input of a gate 324, the other input of which is connected to bus line 178 for receiving the three Mhz CLOCK signal from microprocessor 150 of FIG. 5.

The combination of flip-flop 320 and gate 324 control the input to the timer of device 280. Under most conditions, flip-flop 320 is held in a preset condition to allow the 3 Mhz CLOCK signal to be continuously applied regardless of the signal coming from the light to frequency converter 316. When the program determines to make a light measurement, the state of flip-flop 320 is changed to the reset condition and the flip-flop waits for a pulse from line 318 to the clock input to toggle the Q output to a set state. Gate 324 then is opened and the 3 Mhz CLOCK signal from r:icroprocessor 150 will be applied to the timer of device 280. This will continue until the second pulse is received on line 318 from the light to frequency converter 316 at which time the Q output of flip-flop 320 will reset and the gate 324 will block the incomeing 3 Mhz CLOCK signal from the microprocessor 150.

The device 280 also has a TIMER cut port, which is pin 6 on the Intel 8056 device, which is the system clock running at 1000 Hz. Port CE, which is pin 8 on the Intel 8156 device, is the chip enable function. The input/output pins and timer are located at 8× Hex locations while the internal memory is located at 8000 Hex to prevent the programmable peripheral interface 230 from being enabled. The internal memory of device 280 is used to hold the return addresses from the interrupt call routines and also for the variable storage needed for use in the program. The address/data ports AD0-AD7 are connected to bus lines 158-165, respectively. The remaining ports are necssary for use with the multiplex bus of the microprocessor.

Figure 8:
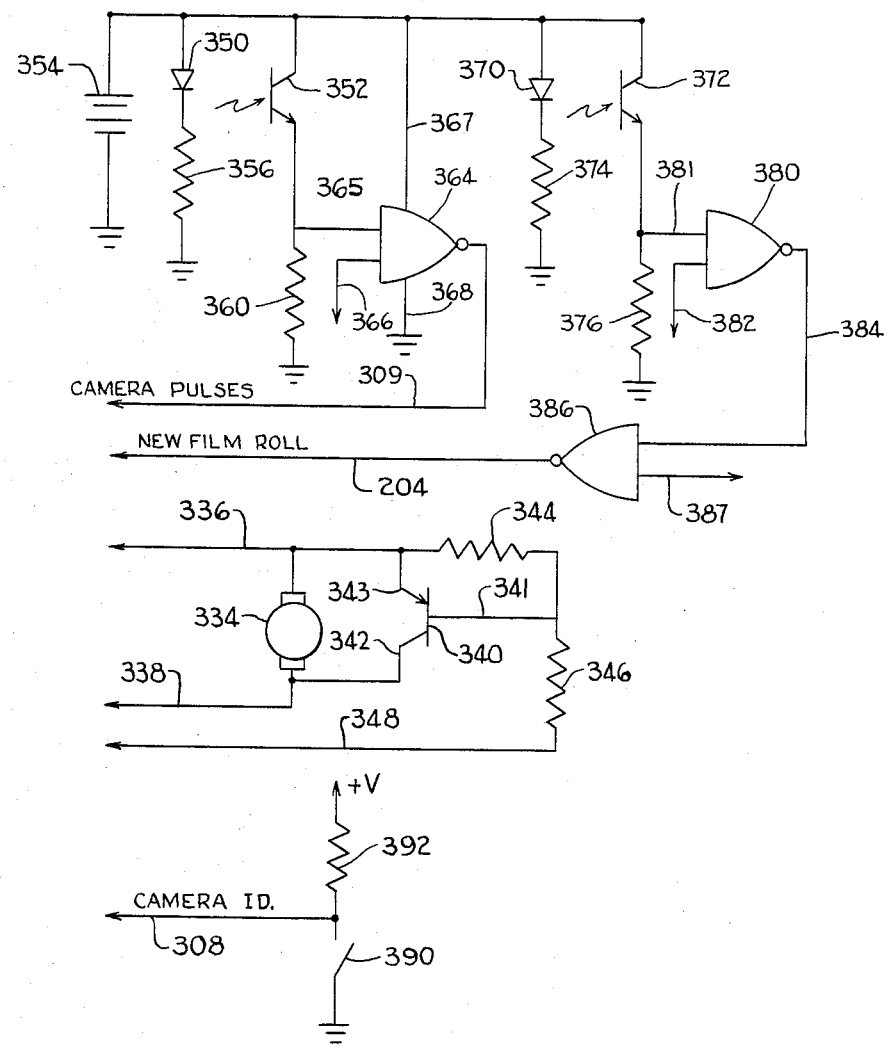
FIG. 8 is a schematic diagram of motor and control circuits in the camera of FIG. 1.

FIG. 8 illustrates various motor, control and sensing or monitoring circuits associated with camera 26. A d.c. motor 334 is provided for driving the camera film takeup spool to unwind film from a supply roll and advance the film from frame to frame between exposures. Line 336 connects one terminal of motor 334 to a source of supply voltage. This is under control of the motor advance signal provided in response to a predetermined state of the motor signal on line 261 from the programmable peripheral interface of FIG. 6 as previously described. Line 338 connected to the other terminal of motor 34 is a return line to the power supply. A dynamic braking circuit is provided operatively associated with motor 34 to stop the film advance when desired and in a manner preventing coasting. The dynamic braking circuit comprises a transistor 340 having base, collector and emitter terminals 341, 342 and 343, respectively. The collector-emitter path of transistor 340 is connected across motor 334. The base terminal 341 is connected through a first resistor 344 to the emitter terminal thereof. The base terminal 341 also is connected to one terminal of a second resistor 346, the other terminal of which is connected by line 348 to the circuit associated with line 261 from programmable peripheral interface 230 of FIG. 6 responsive to a motor braking signal as previously described. Thus, when it is desired to turn motor 334 off to stop film advance, voltage on line 336 is turned off, and a signal is applied to line 348 to turn transistor 340 on to dissipate energy in motor 334 thereby providing dynamic braking to prevent coasting of the motor and film. By way of example, in an illustrative circuit, transistor 340 is type 2N6111, resistor 344 has a magnitude of 1K and resistor 346 a magnitude of 560 ohms.

Camera 26 also includes sensing means for providing signals to the control indicative of film travel and of the presence of a new roll of film in the camera. In particular, FIG. 8 shows a camera monitoring or sensing circuit having a first portion to monitor film advance and a second portion to signal when a new roll of film is placed in the camera. The first portion measures distance traveled by the film during film transport. A pulse is generated each predetermined increment of film advance such that a predetermined number of pulses are provided for each frame of the film thereby enabling the system to keep track of the film advance in terms of number of frames. As shown in FIG. 8, the first portion comprises a light source and photo detector pair in the form of a light emitting diode 350 and photo transistor 352 operatively associated therewith. The light beam from diode 350 directed toward transistor 352 is interrupted by a chopper on the drive shaft for the film advance sprocket in manner which will be described to provide the aforementioned pulses at equal increments during film advance. The anode of diode 350 is connected to the positive terminal of a voltage source 354, the negative terminal of which is connected to ground. Although a battery is shown by example in FIG. 8, an external power supply typically will be employed. The cathode of diode 350 is connected through a resistor 352 is connected to the anode of a resister 360 to ground. The pulses from transistor 352 are slow rising due to the action of the chopper on the light beam. and in order to provide output pulses with faster changing or leading and trailing edges, a Schmitt trigger circuit is provided including gate 364, one input of which is connected by line 365 to resistor 360 and the other input 366 of which is connected to a source of bias voltage. Gate 364 also is referenced through line 367 to the collector of transistor 352 and through line 368 to ground. The output of gate 364 is connected through line 309 to device 280 in FIG. 7 as previously described and includes the pulses from camera 26 containing information as to distance of film travel and number of frames elapsed.

The second portion of the monitoring circuit of FIG. 8 provides a signal indicating that a new roll of film has been placed in the camera. This is accomplished by signalling when the camera back cover is open. Opening of the cover causes movement of an element affecting a light beam in a manner which will be described. The light beam is between a light source and photo detector pair including light emitting diode 370 and photo transistor 372 shown in FIG. 8. The anode of diode 370 is connected to the positive terminal of source 354 and the cathode thereof is connected through the resistor 374 to ground. The collector terminal of transistor 372 is connected to the battery positive terminal and the emitter thereof is connected through a resistor 376 to ground. In order to shape each pulse from transistor 372 there is provided a first gate 380, one input 381 thereof being connected to the collector of transistor 372 and the other input 382 thereof being connected to a source of bias voltage. The output of gate 380 is connected by a line 384 to one input of a second gate 386. The other input thereof is connected by line 387 to a source of bias voltage. The output of gate 386 is connected by line 204 to the RST 6.5 port of microprocessor 150 as previously described. The signal level on line 204 is indicative of whether or not a new roll of film has been placed in the camera.

Figure 9:
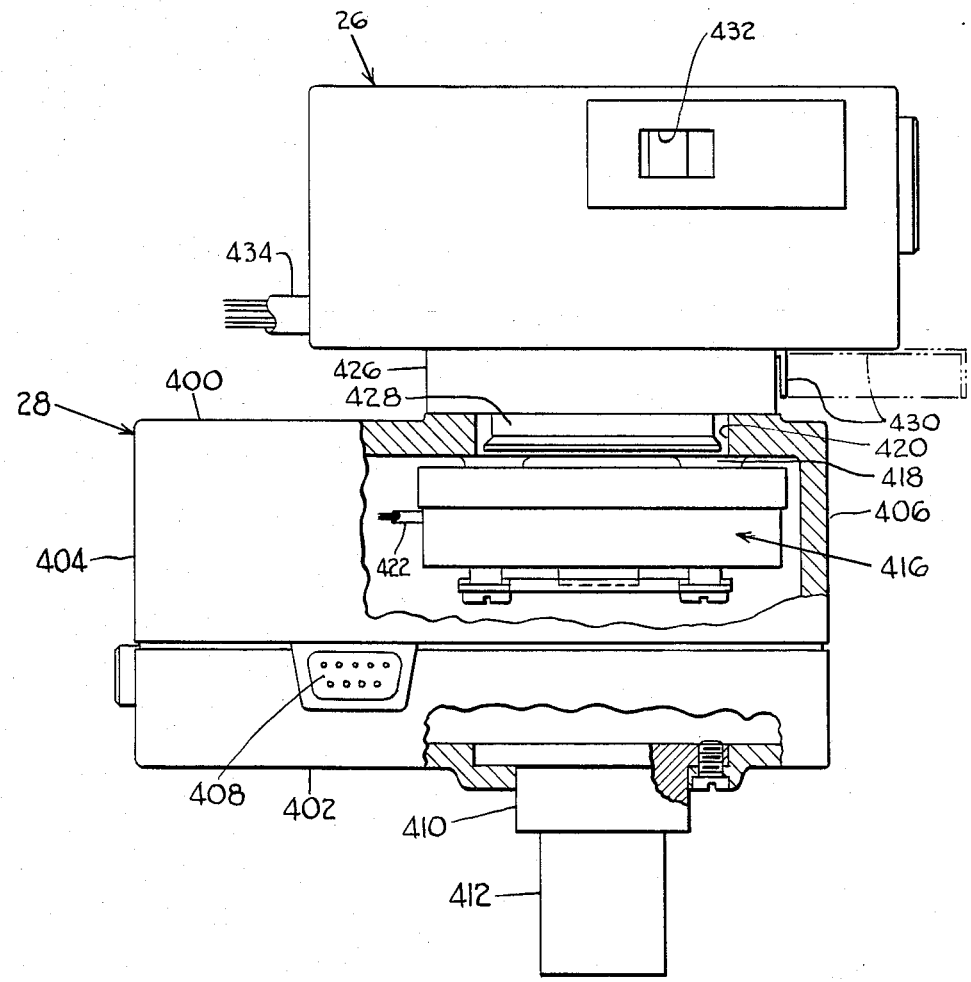
FIG. 9 is an enlarged elevational view, with parts removed, illustrating the camera and shutter/light detector combination in the apparatus of FIG. 1.

The circuit of FIG. 8 also includes a portion providing an indication of camera type. A switch 390 is connected between ground and one terminal of a resistor 392 the other terminal of which is connected to the system plus V voltage. The opened and closed states of switch 390 provide different signal levels on line 308 which can indicate two types of camera being employed. This signal level is connected to port PC2 of RAM 280 as previously described FIG. 9 is an enlarged view of the combination of camera 26 and shutter and light detector 28 of FIG. 1 which illustrates the shutter and light detector 28 in further detail. The shutter and light detector 28 includes a hollow rectangular housing having a top wall 400 as viewed in FIG. 9, a bottom wall 402 spaced therefrom, and spaced apart side walls 404 and 406. The light detector is located in the lower part of the housing adjacent bottom wall 402 and will be described in further detail presently. A receptacle part 408 of an electrical connector extends from the housing wall for making electrical connections between the light detector and control 40. The shutter and light detector combination 28 is operatively connected to a microscope by a tubular connecting element having a first, large diameter portion 410 fitted in an opening in the housing bottom wall 402 and a second, smaller diameter portion extending axially outwardly therefrom. As previously described, this coupling element is received and connected in the microscope trinocular body. Thus, the optical path through the microscope 12 extends through the coupling element and further through the housing and through the shutter and camera 26 as will be described.

A shutter mechanism generally designated 416 is provided in the housing and positioned so as to be located in the aforementioned optical path. It is mounted in the housing by a suitable means, such as the arms designated 418, and is located adjacent an opening 420 in the housing top wall 400. The shutter 416 comprises an iris diaphram controlled by a solenoid and is of readily commercially available types such as those sold under the names Illex and Prontor. Electrical power for operating the shutter solenoid is supplied by means of a conductor designated 422.

Camera 26 has a housing of generally rectangular shape as shown in FIG. 9 and is connected to the housing of the shutter and light detector combination 28 by suitable means. The cylindrical housing extension 428 faces and contacts the top wall 400 of the housing of the shutter and light detector 28, and a ring 428 surrounding the camera lens opening and window is received in the opening 420 in housing wall 400. A door release latch 432 is provided on a side wall of the camera housing. An electrical connector 434 extending from the camera housing includes leads for providing electrical power to the camera motor and leads for transmitting control and information signals to and from the camera in a manner which will be described.

Figure 10:
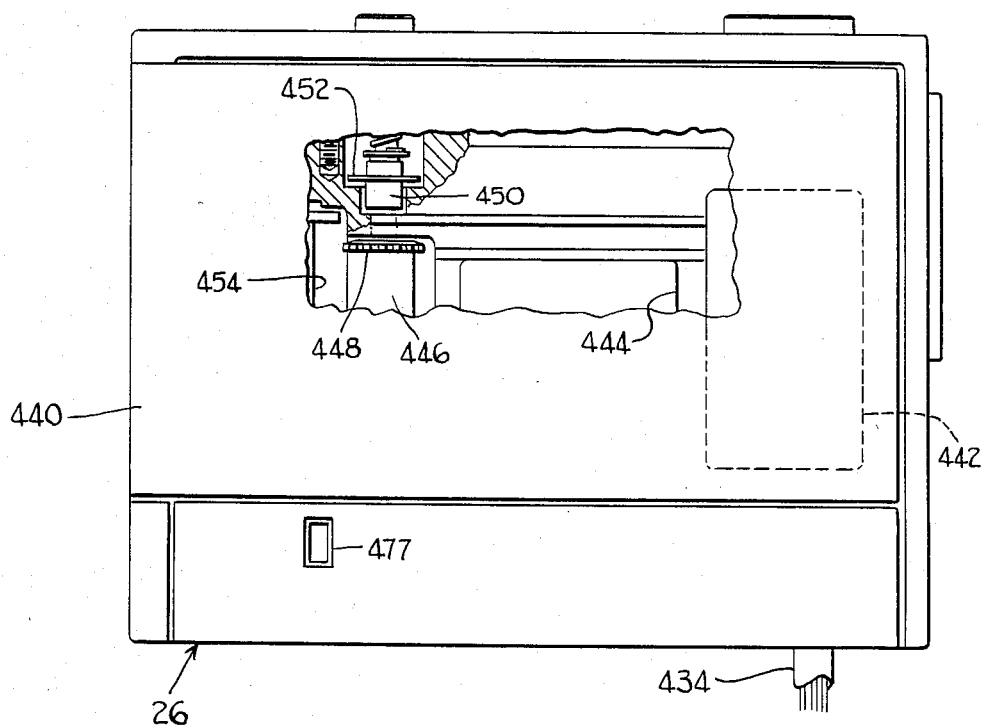
FIG. 10 is a rear elevational view, with parts removed, of the camera shown in FIG. 9.
Figure 11:
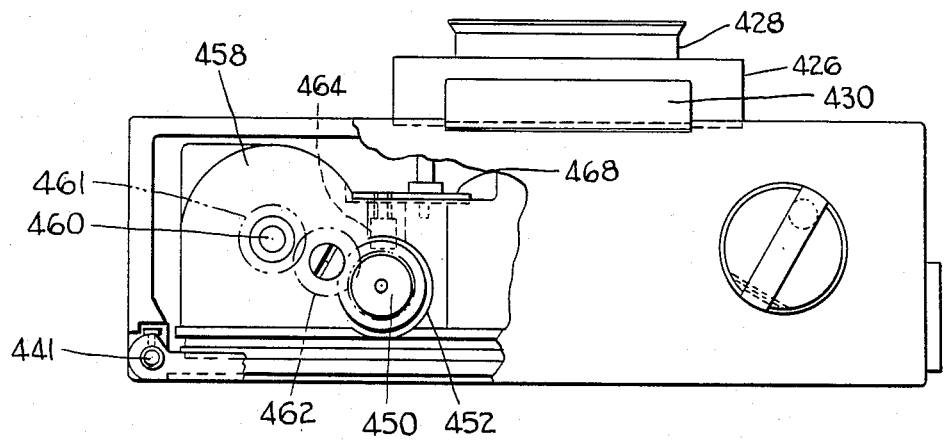
FIG. 11 is a side elevational view, with parts removed, of the camera of FIG. 9.

FIGS. 10-13 show in further detail the camera 26 and the sensing means therein for providing signals indicative of the extent of film travel and a signal indicating the presence of a new roll of film in the camera. Referring first to FIG. 10, camera 26 has a back cover 440 pivotally connected to the camera housing by a hinge 441 shown in FIG. 11 in a conventional manner. A film supply roll 442 is shown in FIG. 10 and positioned for unwinding and feeding of the film past a lens opening 444 through a sprocket 446 having film engaging teeth 448 onto a takeup reel 454 in a known manner. Mounted on the sprocket shaft portion 450 is a chopper disc 452 having equally circumferencially spaced openings for movement into and out of registry with the light beam in between a light source and photo detector pair i.e. the LED 350 and phototransistor 352 of the circuit of FIG. 8. By way of example, in an illustrative apparatus, there are eight openings equally circumferencially spaced around chopper disc 452 so as to provide eight output pulses per frame during film travel. Thus, the control 40 counts these pulses and after the eighth pulse commands turning off of the camera motor and energizing of the dynamic brake to stop the film advance as previously described prior to exposure of the particular frame moved into position relative to lens opening 444. FIG. 11 illustrates one possible arrangement of a camera motor output shaft 460 shown near a casting 458 provided with a gear 461 thereon which meshes with an intermediate gear 462 rotatably mounted in the housing for transmitting drive to both the sprocket 446 and takeup reel 454. Various drive arrangements and relative locations of the motor can of course be employed. As shown in FIG. 11, the light source and photodetector pair is contained in a housing 464 which is located for operative association with the periphery of the chopper disc 452 containing the openings as previously described. The housing 464 is mounted on a circuit board 468 or the like which, in turn, is suitably supported in the camera housing.

Figure 12:
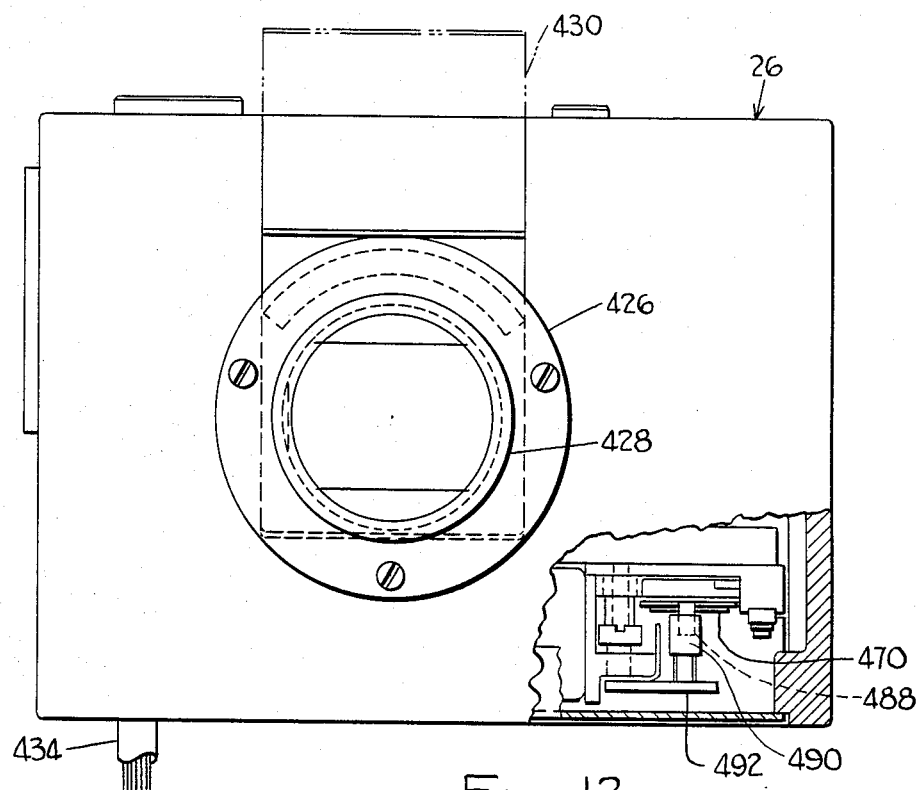
FIG. 12 is a front elevational view, with parts removed, of the camera of FIG. 9.
Figure 13:
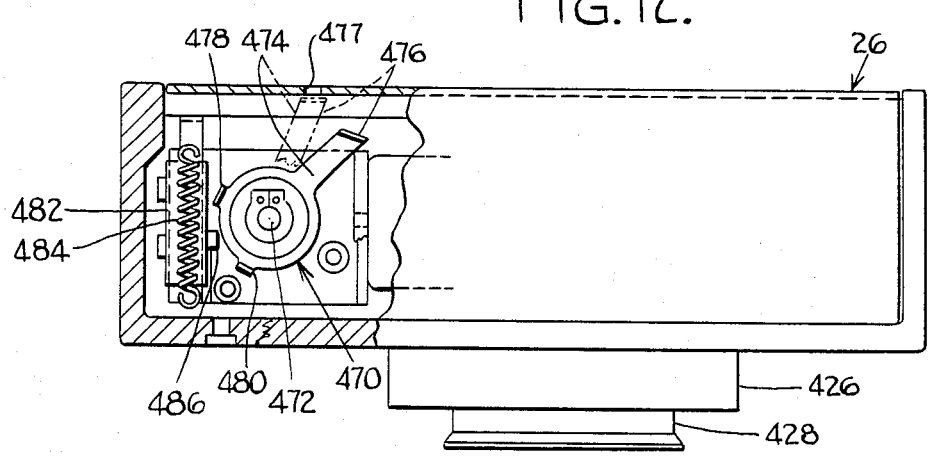
FIG. 13 is an opposite side elevational view, with parts removed, of the camera of FIG. 9.

FIGS. 12 and 13 illustrate the mechanical portion of the means for signalling the presence of a new roll of film in the camera 26. Briefly, the opening of the camera door 440 causes movement of an interrupter vane out of the light path between a light source and a photo detector pair i.e. the LED 370 and photo transistor 372 in the circuit of FIG. 8. When the camera drive motor first is turned on, by means of a connection between the motor friction clutch and the vane, the vane is moved to a position interrupting the light path. The vane stays in that position even when the camera drive motor is stopped between film frames. When door 440 is opened, a spring biased arm moves in response to the door opening to move the vane out of the light path. This mechanical approach provides an indication even when the system power is off. Referring first to FIG. 13, there is provided an arm member 470 having a generally circular main body portion and fixed to a shaft 472 from the motor friction clutch. Member 470 has an elongated arm portion 474 which terminates in a tip formation 476 for movement into and out of registry with a viewing opening 477 in the camera back. The main body of member 470 is provided with a pair of circumferentially spaced short arms 478, 480 located for operative engagement with an assembly including an arm member 482, a biasing spring 484, and a dog member 486 carried by arm 482. As shown in FIG. 12, the arm member 470 is also provided with a vane portion 488 which is located to be in operative association with a light source and photo detector pair contained in a package or housing 490 mounted on a circuit board or the like 492 suitably supported in a camera housing. The vane 488 is shown in FIG. 12 interrupting the light beam between the source and photo detector.

The solid line position of member 470 if FIG. 13 corresponds to an initial position, out of the light beam and prior to the first energization the camera drive motor at the beginning of film advance. The member 470 is moved into the broken line position in FIG. 13 after the initial enerization of the motor as previously described. In this position, the tip formation 476 may be viewed through the opening 477 in the camera back. In this position the short arm 478 on the member 470 is in contact or engagement with the dog 486 of arm 482. Member 470 remains in the broken line position of FIG. 13 during the on-off conditions of the camera motor as the film is advanced frame-to-frame. After the roll of film has been advanced through all of the exposures, rewound and it is desired to remove and replace it with a new film roll, upon opening of the camera door 440 arm 482 is moved by spring 484 upwardly as viewed in FIG. 13 and dog 486 also causes pivoting of member 470 in a clockwise direction about shaft 472 to the solid line position in FIG. 13 out of the light beam. This provides a signal on line 204 to micropressor 150 indicating opening of camera door 440 which is interpreted as a new roll of film being placed in the camera as previously described.

Figure 14:
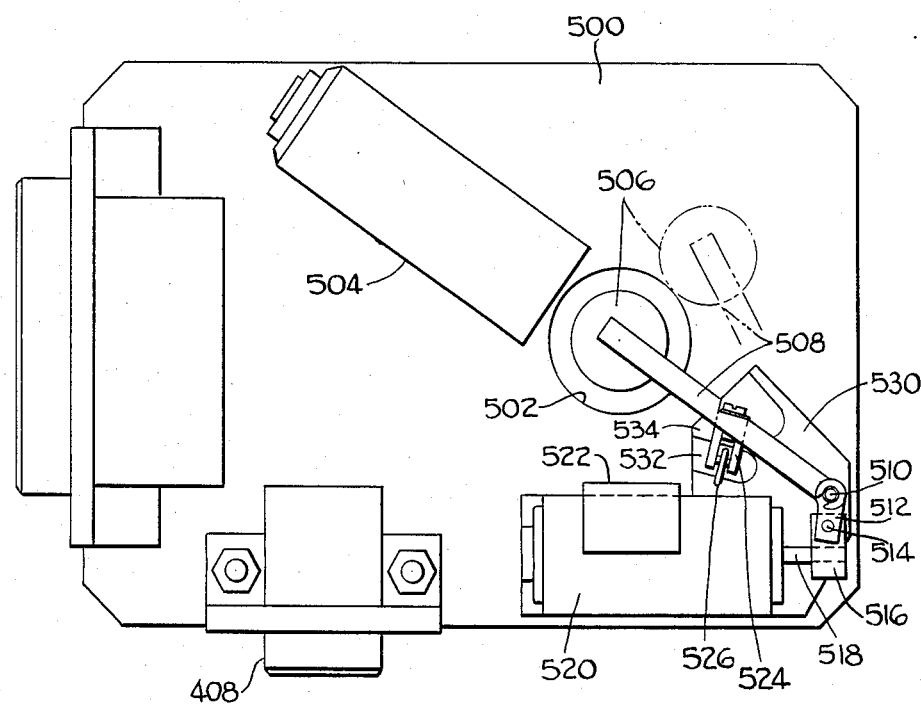
FIG. 14 is a plan view of the light detector in the combination shown in FIG. 9.
Figure 15:
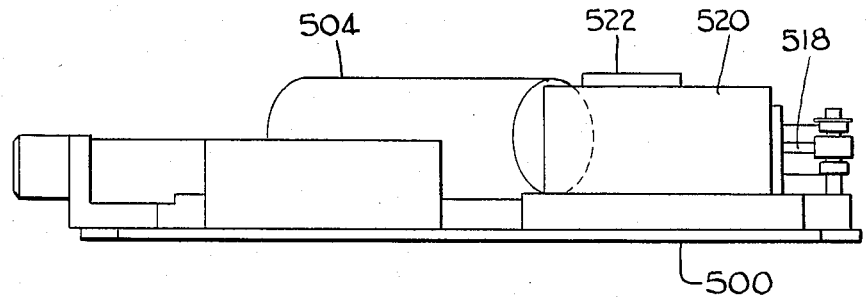
FIG. 15 is a side elevational view of the light detector of FIG. 14.

FIGS. 14 and 15 illustrate the light detector for use in sampling or monitoring the intensity of light along the optical path of the apparatus of FIG. 1. As previously mentioned, the light detector is located at the lower end of the housing as viewed in FIG. 9 adjacent the bottom wall 402. A board is mounted in the housing adjacent wall 402 and is provided with an opening 502, in the present illustration circular in shape, which is located in the optical path of the arrangement to allow passage of light therethrough. An optical tube 504 is mounted on the board 500 near opening 502 and contains a focusing lens and the photocell of the light to frequency converter 316 of FIG. 7. The other components of the converter 316 including the circuit thereof are mounted on board 500 in a suitable manner. There is provided light sampling means in the form of mirror 506 for directing light from the optical path to the detector or photocell in tube 504. Mirror 506 is circular in shape having a diameter less than that of opening 506 but of sufficient size to adequately sample the intensity of light in the optical path. The mirror 506 normally is located in the optical path for reflecting light into the photocell and is moved out of the optical path immediately prior to exposing of the film. As a result, during such exposure, all of the light in the optical path is available and used in exposing the film. In particular, light travels along the optical path of the apparatus through opening 502 in a direction perpendicular to the plane of the paper as viewed in FIG. 14. Mirror 506 is disposed at an acute angle to the plane of the paper and toward tube 504. In the solid line position illustrated in FIG. 14 mirror 506 directs light from the optical path to the photocell within tube 504, and mirror 506 is moved between that position and the broken line position out of the optical path by the following arrangement.

An elongated arm 508 is fixed at one end to the non-reflecting side of mirror 506 and is pivotally connected at the opposite end thereof by means of a pin 510 to one end of a relatively short link 512, the other end of which is pivotally connected by pin 514 to a connector element 516 fixed to the end of the rod 518 of a solenoid 520. A bracket 522 mounts solenoid 520 to board 500 in a suitable manner. The arm 508 is supported during movement by an element 524 fixed to approximately the mid point of arm 508 and which rotatably carries a wheel 526 which contact a plate 530 on board 500. The plate 530 has two detent regions 532, 534 between which wheel 26 moves in the two positions of arm 508 illustrated in FIG. 14. Upon energization of solenoid 520 to move rod 518, the linkage moves arm 508 to the broken line position as illustrated in FIG. 14. Solenoid 520 is electrically connected to the lines 242 and 244 from programmable peripheral interface 230 in FIG. 6 for receiving signals causing appropriate operation of solenoid 520 to place mirror 506 either in or out of the optical path as previously described.

Figure 16:
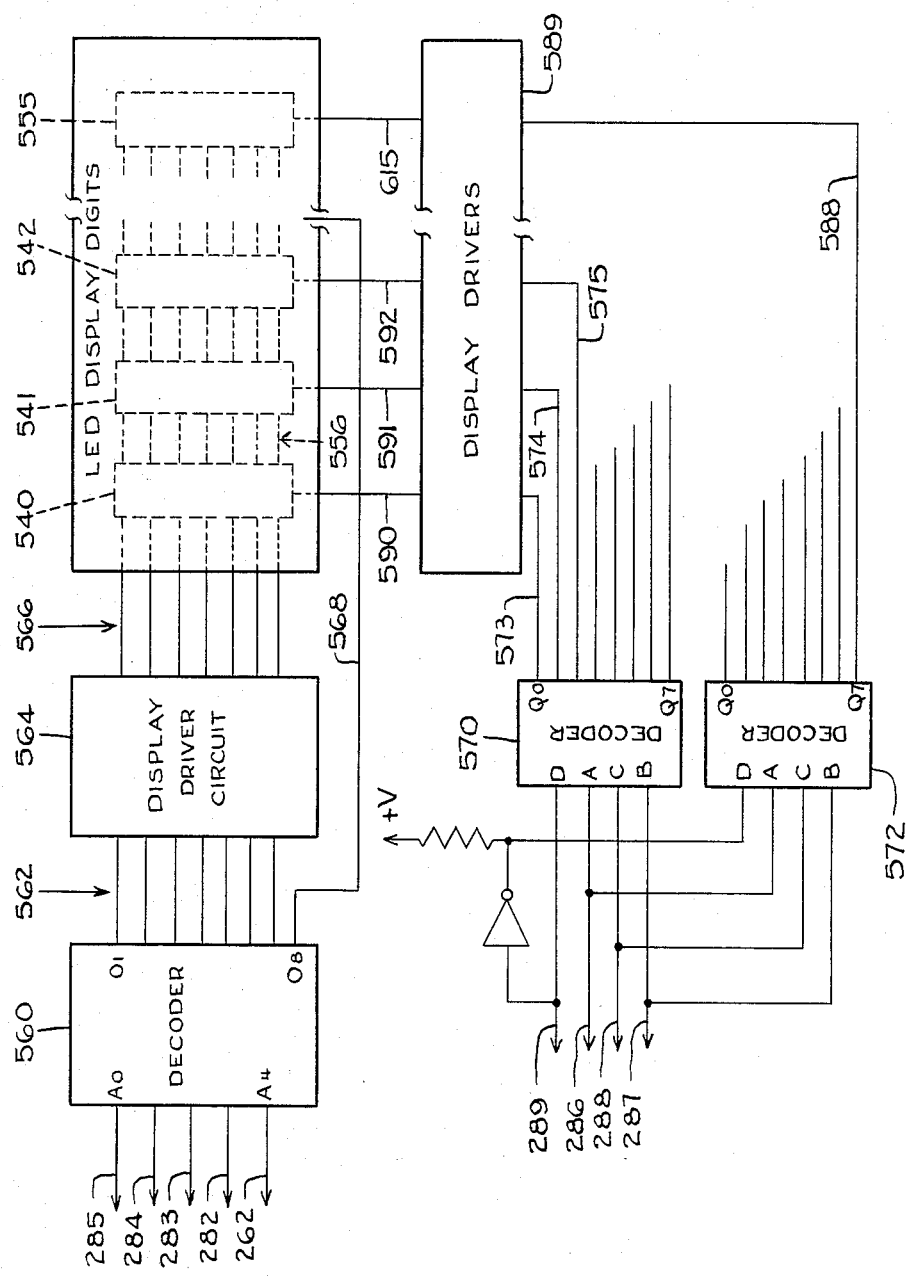
FIG. 16 is a schematic block diagram of the display in the apparatus of FIG. 1.

FIG. 16 illustrates in further detail a preferred form of display 36 in the apparatus of FIG. 1. Display 36 comprises a plurality of light emitting diode display digit elements, in particular sixteen, connected serially in a row. Four of these elements, designated 540, 541, 542 and 555 are shown in FIG. 16, and adjacent elements are electrically connected by a plurality of lines, such as the seven lines designated 556 connecting elements 540 and 541. There is provided a decoder 560 in the form of a 32×8 PROM for decoding the binary coded decimal number signals from the component 280 in FIG. 7. In particular, the A3, A2, A1 and A0 inputs of decoder 560 are connected through lines 282, 283, 284 and 285, respectively, to the corresponding output ports of component 280. The A4 port of decoder 560 is connected by line 262 to the message control output of the programmable peripheral interface 230 in FIG. 6. The output ports $O_1$–$O_7$ are connected by the seven lines generally designated 562 to inputs of a display driver circuit 564, the outputs of which are connected by lines 566 to the first one of the serially connected arrangement of display elements. In particular, the display driver circuit 564 includes seven paths each including a transistor follower package in series between two resistors which provides the necessary drive current for the display elements in a known manner. The seven lines 566 connect outputs of driver circuit 564 to seven inputs of the first display element 540. The seven outputs of element 540 are connected to the seven inputs of element 541 and so on through the serially connected arrangement.

If the signal on line 262 is low the number character set is selected and the outputs will turn on the pattern for the appropriate number. If the signal on line 262 is high, the message display will be selected. Then some letter patterns can be generated for preprogrammed messages. During message display, the decimal point in the exposure field is controlled by the $O_8$ output port of decoder 560 which is connected by line 568 the appropriate location in the display arrangement. The appropriate digit in the display is selected by the coded address present on lines 286, 287, 288 and 289 from component 280 in FIG. 7 which are applied to the inputs of decoders 570, 572 as shown in FIG. 16. The decoded address is on the sixteen output lines of decoders, four of which are designated 573, 574, 575 and 578, which are connected to corresponding ones of sixteen display drivers generally designated 589. The display drivers preferably comprise Sprague drivers for providing the sink current necessary. The outputs of the sixteen display drivers are connected by sixteen lines, four of which are designated 590, 591, 592 and 615 in FIG. 16 to corresponding ones of the sixteen display elements.

Keyboard 34 includes a circuit which gives a signal coded according to keypress by row and column. The column is selected when the first four digits of the display are active. The column selection signal is decoded by demultiplexer 290 in FIG. 7 and the column selected by signals on lines 293–296. The system then strobes the keyboard by bringing the KEYBOARD STROBE signal on line 265 in FIG. 6 low for a few microseconds and then looking at the keyboard return signals on lines 298–303 in FIG. 7. If a key was pressed, then one of these lines will be high. If so, then the column number will be remembered when the same digit is selected again. When this time comes, both the KEYBOARD STROBE and KEYBOARD HYSTERESIS signals on lines 265 and 264 in FIG. 4 will be brought low. If the keyboard return lines 298–303 are high, then the keyboard 34 has a valid key to be processed. This procedure is used to prevent "teasing" of keys. By way of example, in an illustrative apparatus a form of keyboard 34 found to perform satisfactorily is available from Elko Corp., Norcross, Ga.

The light to frequency converter 316 provides output pulses on line 318 in FIG. 7 proportional to the intensity of light incident on the photocell. Connector 316 includes a voltage to frequency converter with an integrator in the feedback loop and the photocell connected to the summing junction. Current from the photocell is accumulated by the integrator and applies the first or upward portion of a ramp function waveform to the converter and when it exceeds a threshold magnitude and a predetermined time thereafter the converter injects current into the summing junction thereby providing the second or downward portion of the ramp function waveform. Cyclic operation of the foregoing provides output pulses from the converter. At low light levels, encountered for example with relatively dense specimens on microscope slide, the frequency of output pulses may be undesirably low for processing by the rest of the system. Accordingly, in response to a command signal on line 256 as previously described, the converter 316 operates to attenuate the current injected to the summing junction, by switching resistance into the current path to the junction and thereby increase the frequency of output pulses on line 318 for compatibility with the system measuring time, which can be ⅓ second. For a more detailed description of converter 316 reference may be made to the above-identified application Ser. No. 483,408. Also, the silicon photocell employed, being the current generating type, has a relatively broad spectral response. With the dynamic range adjustment capability of converter 316, the system can make effective use of the broader spectral response of the photocell.

As previously described the presence of a pulse on line 318 ultimately applies the 3 Mhz clock signal from microprocessor 150 to the TIMER IN port of component 280. This also starts the 1000 hz timer in component 280 whereupon the next pulse on line 318 stops the 1000 hz timer. The number of timer overflows during this interval is determined to provide a number of counts used in calculating exposure time. By way of example, assume the frequency on line 318 is 300 hz corresponding to a particular light level. During the interval between pulses, there would be three timer overflows plus 1000 counts left in the timer. Therefore, the total timer counts would equal three timer overflows times 3000 plus the 1000 counts left over in the timer or 10,000 total counts. The factor of 3000 is due to the 3 Mhz clock signal. This technique provides accommodation of very small changes in light intensity which can be important at high light levels. With a large number of pulses during the interval between pulses from converter 316, a small change in the interval gives a relatively large change in the number of pulses for the system to process. Such a small change in the interval between pulses from converter 316 could be significant at high light levels.

Thus the photocell signal, being proportional to luminous intensity, provides a proportional increasing frequency. These pulses are counted as described above and a total predetermined count will determine the time the shutter is opened. The total number of counts will be determined by four factors: ASA or DIN speed, format, light/dark ratio and reciprocity. Each factor will contribute a multiplier which will determine the total counts as the product of film speed factor, format factor, light/dark ratio and reciprocity.

It can be assumed that the fastest exposure time and therefore the minimum number of counts will be when ASA 6400 or DIN 39 is selected, a 35 mm camera with 2.5× magnification is selected, the light/dark ratio is 0.1 and there is no reciprocity. In particular, considering first the film speed contribution, with the assumption of ASA 6400 or DIN 39 and that the multiplier is one, the time required for the same amount of light using ASA 8 or DIN 10 will be 800 times longer. As to format selection, using the 35 mm 2.5× camera selection as a multiplier of 1, the 35 mm camera with 5×1 magnification can select a multiplier of 2, and the $3\frac{1}{4} \times 4\frac{1}{4}$ and 4×5 camera can provide multipliers of 4 and 8, respectively. For the light/dark ratio a selection of 1.0 would be normal and, for example, a ratio of 0.1 would be 1/10 exposure. Reciprocity is a time dependent function which will have no effect when reciprocity is set to 0 and maximum time set to 99. It would appear, for example, that the worst case for reciprocity is KODAK black and white film 100 second exposure. In such case, exposure time should be 1200 seconds or 12 times longer.

After the foregoing factors are determined all three are multiplied together and with a unit factor, i.e. (film speed factor) (format factor) (light/dark ratio) (unit factor) with the unit factor being stored in memory representing the number of counts when ASA=6400, format=35 mm 2.5×, ratio=0.1 and no reciprocity. After this multiplication the result will represent the total counts expected to complete the exposure. If reciprocity is inserted, the final number obtained according to the foregoing procedure is applied to the time dependent function of reciprocity to determine what, if any, adjustment in exposure time is needed.

By way of further explanation, the procedure to calculate time is as follows: With a factor change (ASA or format) a routine is called to calculate a product used in calculations. The ASA multiplier values will be from 1 to 8000 for ASA 6400 to ASA 8 and DIN 39 to DIN 10. The format multiplier will be 1, 2, 4 or 8 as previously described. Multiplication values will be 1 * 1 for a minimum of 1 to 8000 * 8 for a maximum of 64000. When time comes to measure the frequency of output pulses from converter 316, the count from ASA - Format computation is multiplied with the time factor. Then a determination is made of reciprocity is selected. Using the calculated time the additional reciprocity time is calculated, if any. Finally, the time factor is multiplied in, and with this the total counts can be determined. These calculations occur as soon as light is on the photocell, and the display is updated every second thereafter.

The foregoing is illustrated further by the following example: After obtaining total counts:

$$\text{count} = \text{format multiplier} * \text{film speed multiplier} * \frac{\text{light pulses}}{65536}$$

Where the number 65536 represents a 16 bit right shift. Then a correction factor is applied to obtain the proper time value. In particular, if the low frequency mode of converter 316 has been selected, $$\text{TIME (whole number)} = \frac{\text{count} * 39168}{65536} = \text{seconds} \times 100$$

Where 39168 is a conversion number to obtain time in milliseconds, given a count. If the high frequency mode is selected, $$\text{TIME (whole number)} = \frac{\text{count} * 783}{65536} = \text{seconds} \times 100$$

The foregoing assumes the first reciprocity number is set to 4. For a different number, a look up table is employed to find the multiplier.

If a running count down timer in component 280 of FIG. 7 is used, the remaining time is known by converting the displayed exposure time. Before exposure the calculated time is stored in case lapse photography is used. This value would be restored when lapse time runs out and exposure should proceed. Thus, the timer in component 280 serves many purposes, such as display refresh request, period measurement, measuring time during exposure, and measuring time between exposures for lapse time photography.

Figure 17:
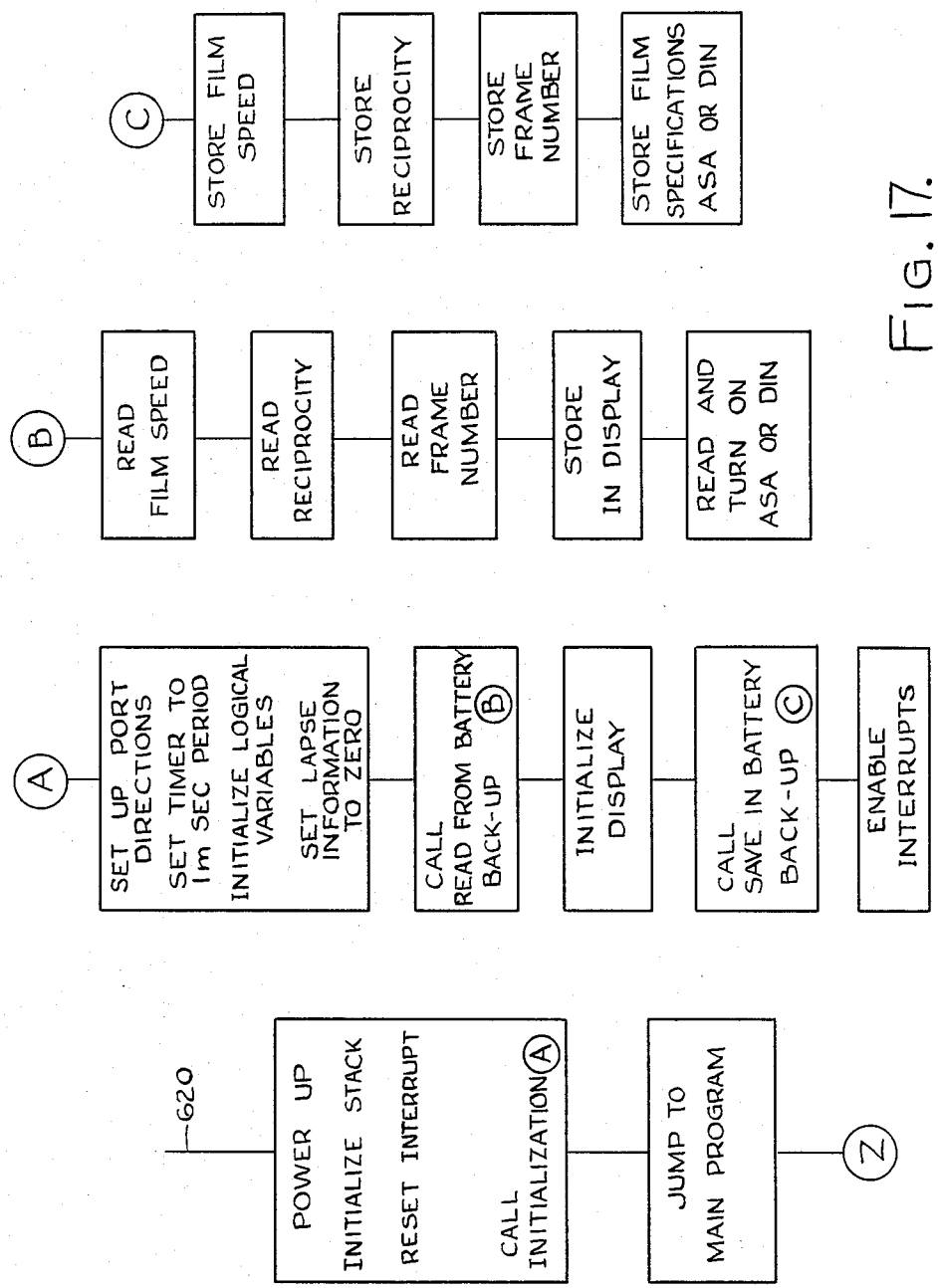
FIGS. 17-24 comprise a flow chart illustrating the program for controlling the exposure and camera control according to the present invention.

The operation of the exposure and camera control of the present invention will be described further in conjunction with the program illustrated by the flow charts of FIGS. 17-24. Although various program languages can be employed, with the illustrative components described in FIGS. 4-7 PLM language was found to provide satisfactory results. Referring first to FIG. 17, the portion with the input designated 620 illustrates a jump table for the power up state and for the various interrupts associated with microprocessor 150 is FIG. 5. It causes a jump to the program portion in FIG. 18 having the input designated 630 every 0.001 second to increment the system time variable in a manner which will be described. This is the rate of the timer in component 280 as previously described. It calls an interrupt routine on the RST 6.5 pin of microprocessor when a signal on line 204 indicates camera door 440 has opened and a new roll of film inserted, and it sets a variable to command advance of the film when the exposure button 90 or film advance button 92 is depressed.

Figure 18:
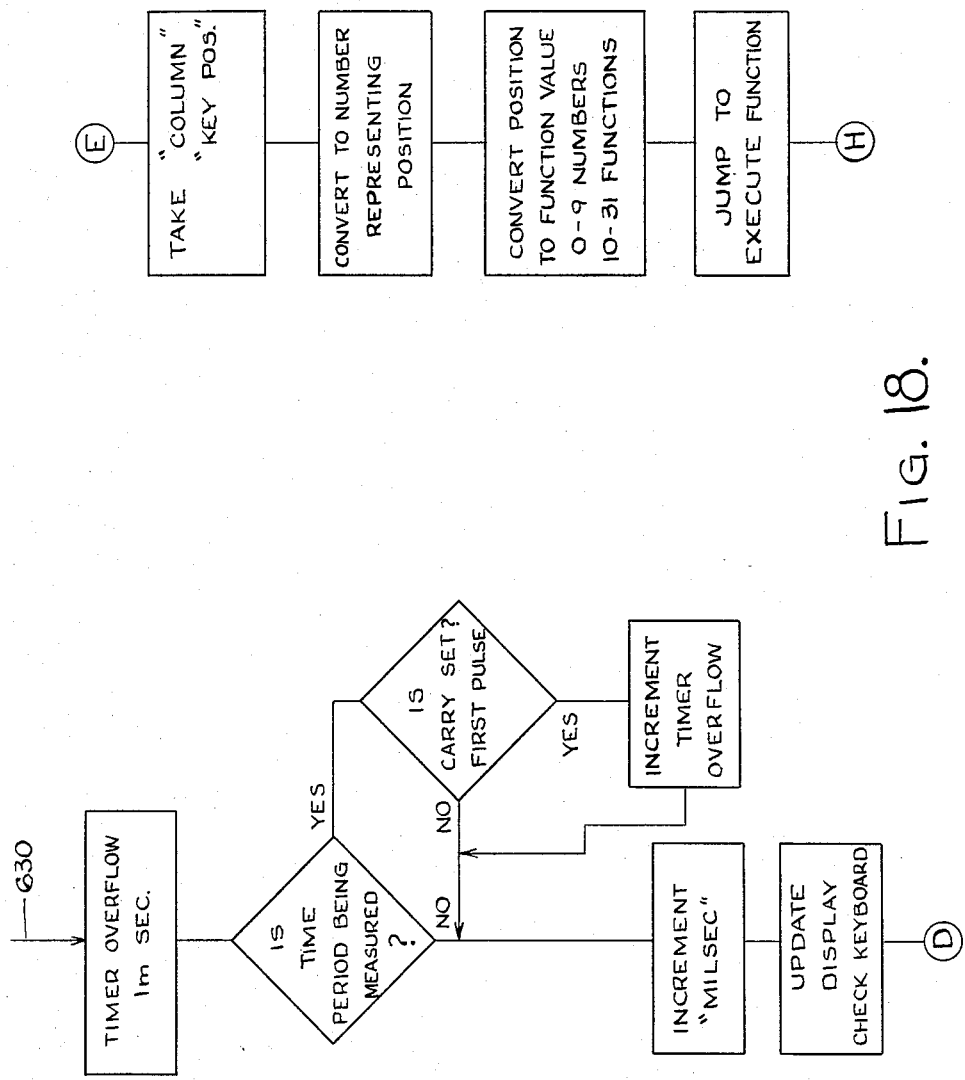

It also calls the following routine when a pulse from light to frequency converter 316 is applied by line 192 to pin RST 7.5 of microprocessor 150. It is entered with the first pulse and then waits until the second pulse occurs. During the time between pulses, the timer in component 280 of FIG. 7 will count the 3 Mhz clock pulses applied to the TIMER IN port. If the timer underflows the variable TIMER OVERFLOW in the routine of FIG. 18 is incremented as will be described. This variable is checked during the measurement process for its value. If the light to frequency converter circuit 316 is in a high light mode, as determined by the logical state of the signal on line 256 from programmable peripheral interface 230 of FIG. 6, a determination is made if TIMER OVERFLOW exceeds a predetermined value. If so, the logical state of the signal on line 256 is changed to switch converter 316 to the low light mode and there is a return to make another measurement later.

On the other hand, if converter 316 is in the low light mode, a determination is made of TIMER OVERFLOW is less than another predetermined value and, if so, the logical state of the signal on line 256 is changed to switch converter 316 to the high light mode and there is a return to make another measurement later. This routine also determines if the low light mode of converter 316 is selected and if so, the program stays here to determine the value of the TIMER OVERFLOW variable.

The foregoing jump table also calls the initialization routine beginning at the point designated A in FIG. 17. The port directions set up are those of the I/O components 230 and 280 of FIGS. 6 and 7, respectively. The timer in component 280 is set to 1 m sec. period as indicated. The logical variables initialized are those in the RAM of component 280. Also, the display variables that were saved are read in, and the display 36 is updated. This routine also calls a read from the battery back up memory which begins at the point designated B in FIG. 17. The back-up memory is provided by the shift registers 182, 184 in FIG. 5 as previously described. Film speed and reciprocity were obtained from keyboard 34 before storage frame number was determined from camera pulses before storage, and these three items are stored in the display as indicated. The ASA and DIN quantities were obtained from the keyboard 34 before storage.

Returning to the initialization routine, after initilizing the display the routine calls a save in battery back-up memory provided by shift registers 182, 184. This program is called with any change in the parameters listed in FIG. 17. Data is output using the SOD line 188 in FIG. 5 and clocked in the same manner as data input. After the initialization routine there is a jump to the main program which will be described.

Referring now to FIG. 18, the program portion having the input designated 630 is called every 0.001 second, i.e. when the TRAP pin on microprocessor 150 is active, and is used to count time for many purposes in the program. The loop in the routine looks for the 3 Mhz asynchronous pulse associated with the TIMER IN port of component 280 in FIG. 7 and the routine cycles in this loop until the 3 Mhz pulse is located. Once the program has the 3 Mhz pulse, the beginning portion of the routine keeps track of the 1000 hz pulses to determine timer overflows. Then the routine increments the TIMER OVERFLOW variable and the variable MILSEC as indicated in FIG. 18. In particular, TIMER OVERFLOW counts timer overflows for use in the program to measure the period from the light to frequency converter 316. MILSEC is a general variable used throughout the system, for example to clock off time during exposure and to clock the maximum time allowed to accept an input from keyboard 34 as will be described. This routine also can be used to decrement a variable every 1/10 second in lapse time photography to clock off time during the lapse period between exposures.

Figure 19:
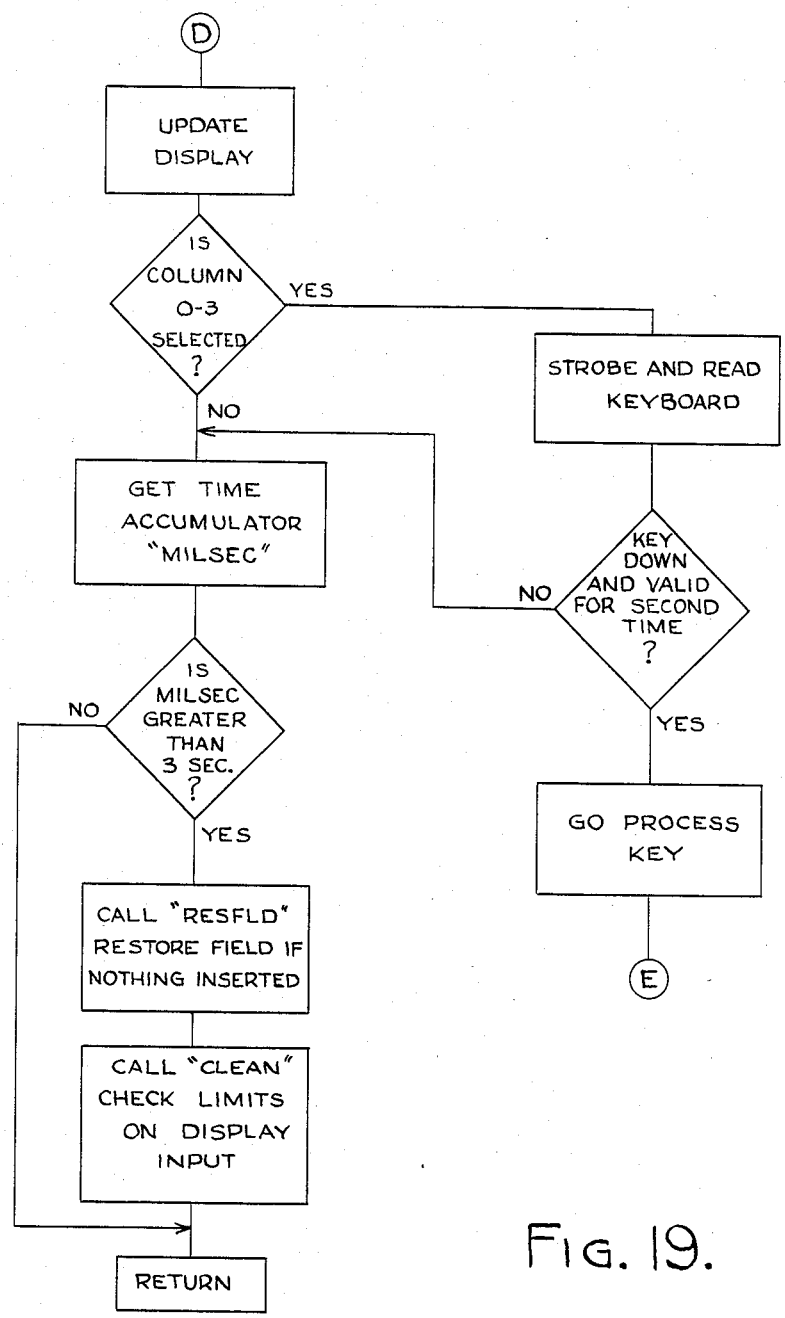

Following the foregoing routine, also every 0.001 second, is a routine illustrated in FIG. 19 with the input D to refresh the display. It is based on the arrangement illustrated in FIG. 16 wherein a BCD to 7 sequent decoder 560 is used for segment information and a four line to 16 line decoder, i.e. the arrangement of decoders 570 and 572, is used for digit selection. The format of data is bits 0–3 the BCD value and bits 4–7 the digit position in binary. As indicated in FIG. 19 a check is used if the keyboard 34 is selected. If the column number is greater than three this indicates there is not a valid keyboard entry. If there is a valid entry then it is strobed with the column number and read back with the key down if any. Demuliplexer 290 in FIG. 7 enables the keyboard with the strobe rate being 60 per second. If the key is down and valid for a second time the program proceeds to go and process that key by the routine of FIG. 18 with input E as will be described.

The variable MILSEC also is checked and if greater than three seconds the program proceeds to reset the field by means of the clean-up sub-routines designated RESFLD and CLEAN which will be described. An example would be depressing a function key with no subsequent data input. In particular, if ASA button 78 on the keyboard were depressed but within three seconds no information input was entered by keys 96–114, then the RESFLD subroutine would be called to restore the original numbers in the ASA field. If the MILSEC variable is less than three seconds, then the program returns to whatever previous task was being performed.

Figure 20:
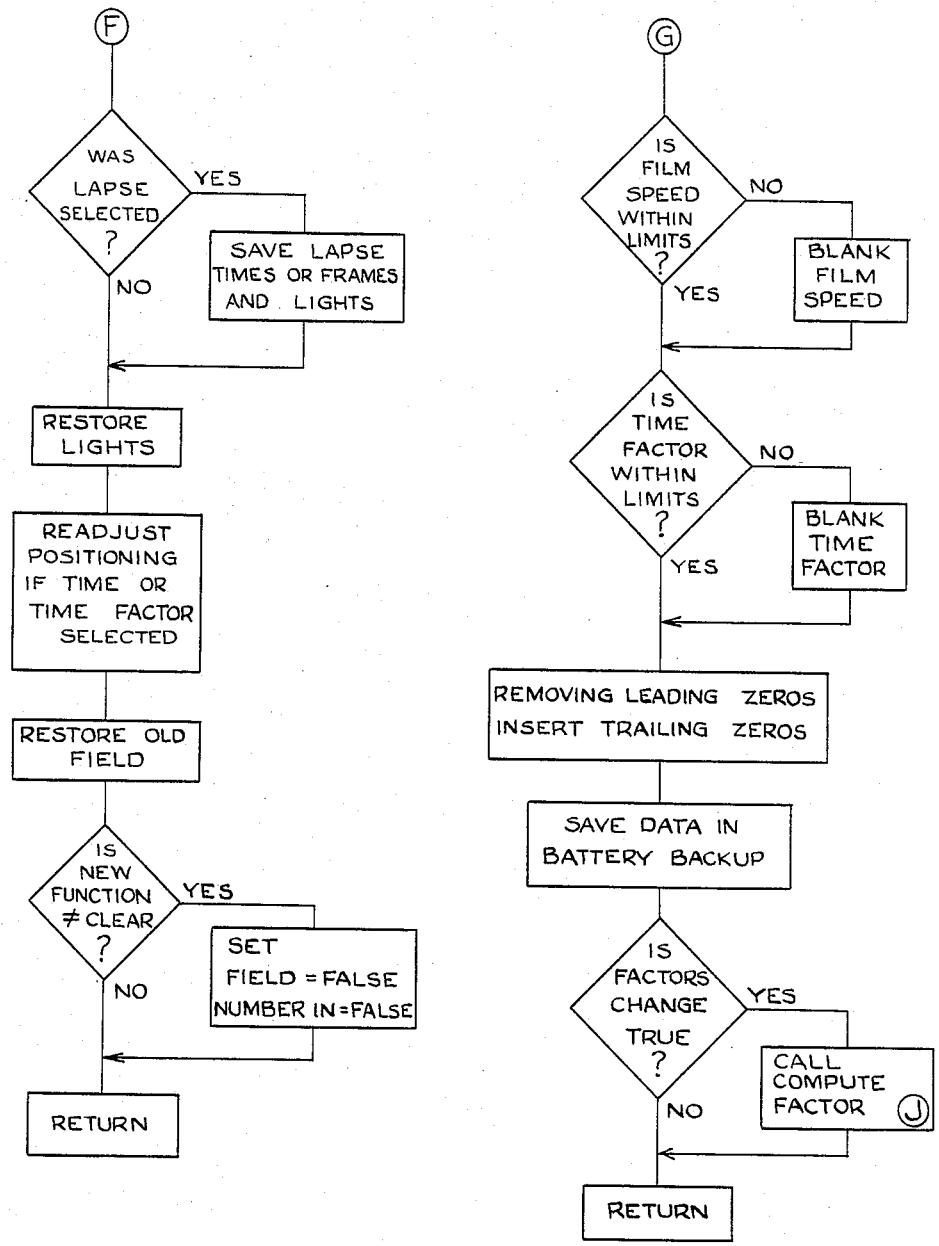

For convenience in illustration, the clean-up sub-routines RESFLD and CLEAN will be described first and thereafter the key processing portion of the program, which is more lengthy, will be described. The RESFLD sub-routine is illustrated in FIG. 20 with the starting point designated F. The first portion determines if the lapse feature was selected and if so the lapse information is stored and the previous time or frame number is restored. The restore lights portion is involved when the operator presses one function key and then decides to go to another. For example, if the operator first presses the ASA button then wants reciprocity instead, this brings the ASA display lamp back on. The next portion, readjust positions, places numbers in the right value for ech field, taking into account that the right hand digit must be considered first. For example, if the operator inputs only a 1, the system changes it to 1.00 and if he inputs 0.15 it is changed to 0.15. The restore old field portion is involved when the operator presses one function, then decides it should be another; this returns the display to its original state for that previous function. The remainder of the routine shown in FIG. 20 continues to process the key.

The sub-routine CLEAN is illustrated also in FIG. 20 beginning at point G. This is called from the display routine after the time-out for accepting numerical data from the keyboard. The first portion checks on the limits of film speed and time factor, and if the limits are exceeded the field is blanked. The next portion inserts leading zero blanking and adds significant zeros. The next portion provides for saving the data in the back-up memory previously described. Finally, a determination is made if any, of the film speed, format, reciprocity or time factors have been selected, all of these functions of course affecting the exposure time. If any was selected, their routine calls a program to compute the exposure time.

Figure 21:
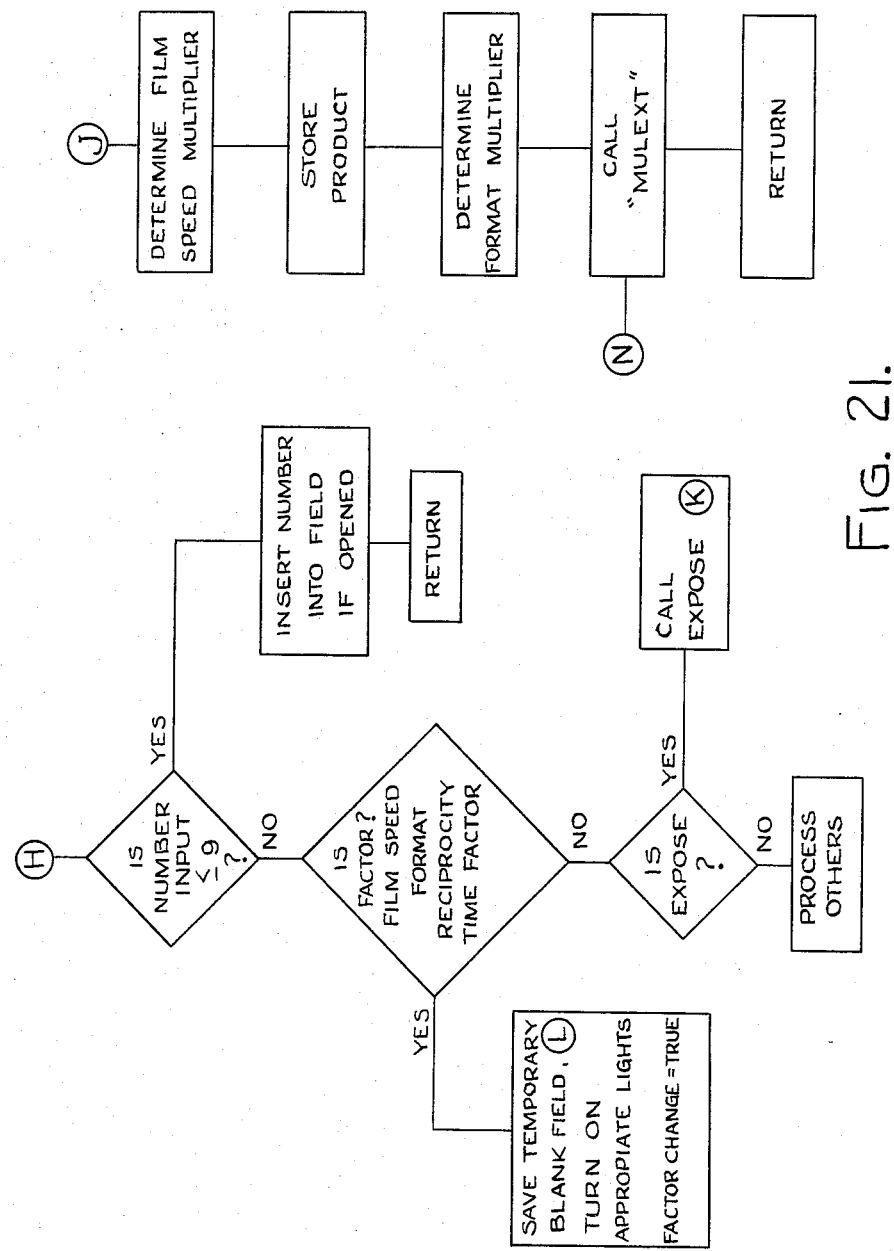

In particular, the program with starting point J illustrated in FIG. 21 is called and it determines the exposure time and number of clock "ticks" to be counted. The clock "ticks" will be ten times more than the displayed exposure time because they occur every 0.001 second and the minimum exposure time is 0.01 second. The program of FIG. 21 takes the displayed factors of film speed, format, reciprocity and time factor, strips the information used only for display output and corrects the raw number to binary. If ASA is used, the film speed multiplier is determined using as a manimum the ASA standard of 6400 and multiliying by 10 according to the relationship:

MULTIPLIER=(6400×10)/ASA

If DIN is used a look-up table is employed to find the multiplier in a known manner. The film speed multiplier then is stored. Nex the format multiplier determined by a look up procedure providing a value which is ten times the real value. For the 35 mm camera with 2.5× magnification the multiplier is 1, for 35 mm camera with 5× magnification the multiplier is 2 and for the 3¼×4¼ and 4×5 camera the multipliers are 4 and 8 respectively. This value also is stored and a multiply routine designated "MULEXT" is called as indicated in FIG. 21 and which will be described. The result is a time in milliseconds.

This completes a tentative multiply procedure, the actual time being determined when light is on the photocell whereupon every second the display is updated. In particular, when time comes to measure the frequency output from the light to frequency converter 316, as will be described, the count from ASA-format computation is multiplied with the time factor and then a determination is made if reciprocity is selected. Using the calculated time the additional reciprocity time is calculated, if any. Finally, the time factor is multiplied in and with this the total counts can be determined.

In particular, the presence of light on the photocell is sensed with a RST 7.5 interrupt at microprocessor 150. Then a period measurement will occur along with the final multiplications of reciprocity and time-factor. With the RST 7.5 interrupt occurring, light must be on the photocell, and a routine is called to measure the period of pulses from light to frequency converter 316. If the overflows that occur from the timer in component 280 of FIG. 7 exceed 10, i.e. light intensity of 10 foot candles and pulse frequency of 100 Hz, converter 316 is switched to the high frequency mode for a more accurate measurement.

Figure 23:
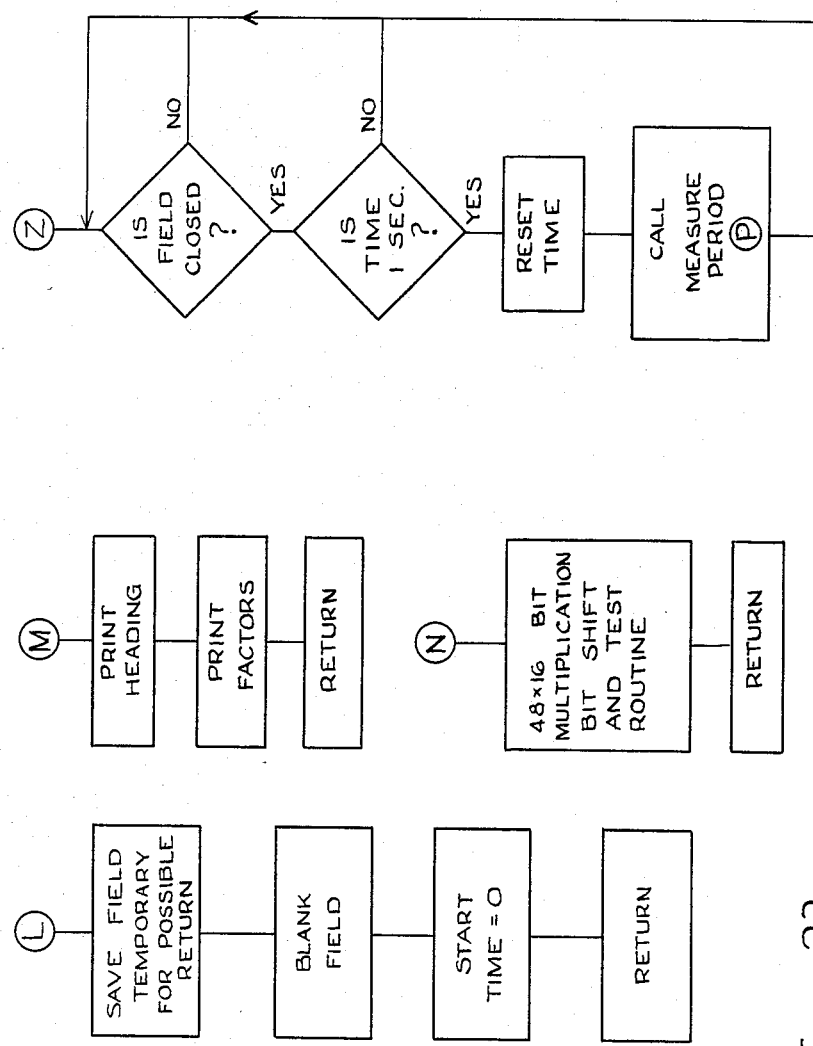

The multiply routine previously mentioned is shown in FIG. 23 with the starting point designated N. It is a program to generate code that is necessary for a triple precision multiplication routine for use in the system. It is a modification of the 16 bit shift and test procedure typically and in most multiplication routines and is accomplished using built in procedures SCL and CARRY. The answer will be in PRODUCT consisting of three 16 bit variables named PRODUCT*HIGH, PRODUCT*MID and PRODUCT*LOW. The procedure will be executed 48 times as follows:

1. Clear low order of PARTIAL*PRODUCT*SUM.
2. And I with I (a dummy variable used to clear the carry flag).
3. Shift left SCL PARTIAL*PRODUCT*SUM.
4. Shift left PRODUCT*LOW.
5. Shift left PRODUCT*MID.
6. Shift left PRODUCT*HIGH.
7. If carry set (carry=off) then add multiplier.
8. If no carry, no add, if not loop 48 times go to 2.
9. Transfer answer to PRODUCT*HIGH, PRODUCT*MID and PRODUCT*LOW.

This is the general procedure with the result left in PRODUCT.

With the forefoing description of the RESTORE and CLEAN sub-routines having been made, the function key processing program initiated in the procedure of FIG. 19 now will be described. The first portion is illustrated in FIG. 18 with the starting point E. It begins by processing the keyboard data, i.e. row and column information, and determining its value in a quantity which the program can handle. This value is converted to a function number which is used in the do case format in an execute function program. A jump is then made to that program which is illustrated in FIG. 21.

The execute function program of FIG. 21 is for processing the keyboard and is called every time there is a valid key press. It looks at the value of the function number previously described in connection with FIG. 18. If the number is from 0 to 9 the number routine will be executed as indicated in FIG. 21. If the value of the function number is greater than 9 a routine will be called to execute that function desired. In particular, if the factor is film speed, format, reciprocity or time factor, the program proceeds to another keyboard processing sub-routine having the starting point L and illustrated further in FIG. 23. It blanks the selected field and approximately adjusts the values of the right hand digit and the number of digits in the field. It also will turn on the display indicator lights. It is involved, for example, in a situation where the operator presses both a function key and number keys and then decides to change only the function.

Figure 22:
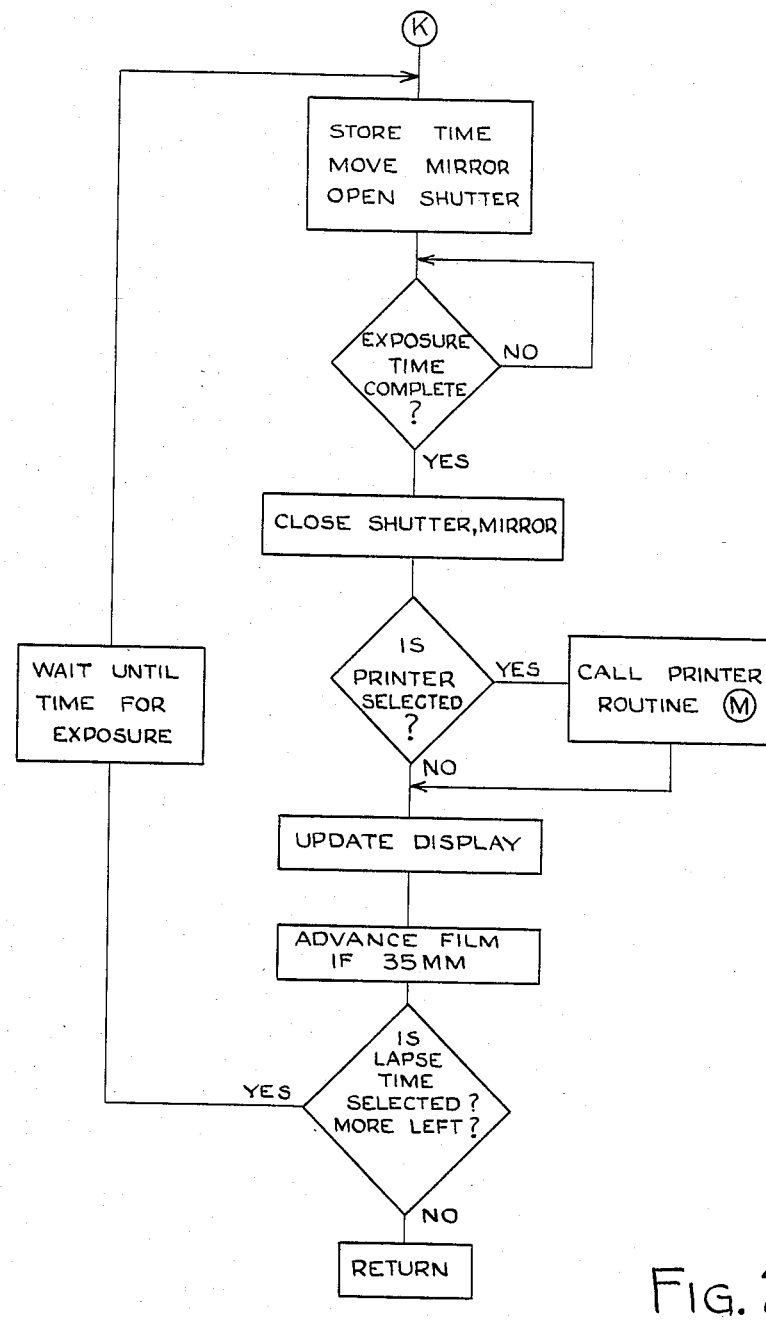

If the function is expose, as indicated in FIG. 21 the expose program is called having the starting point designated K and illustrated in FIG. 22. This program controls the functions necessary for exposure of the film in camera 26 as indicated. In particular, the exposure time, either automatically determined or previously described or manually selected is stored, the program provides the signals to move the mirror out of the optical path and open the shutter as previously described, determine when the exposure time is complete and then closes the shutter and moves the mirror back into the optical path. If the printer was selected, the routine illustrated further in FIG. 23 with the starting point M is called. This routine assumes a parallel interface and by way of illustration printer 60 can be an Olivetti printer with EM1800 controller. The factors printed are a heading, exposure number, film speed, exposure time, format number, reciprocity number and time factor. As indicated in FIG. 22 the display 36 is updated which includes updating the frame number and if the system is in manual exposure mode the exposure time is brought back to the display. The program also advances the film when camera 26 is 35 mm type. This routine is called after each exposure is complete but also will be called for the initial film loading procedure. It turns on the camera motor and looks for the eight pulses per frame previously described. During program execution time between these pulses is measured and if greater than 0.2 seconds the camera motor will be assumed to have stopped, possibly in response to a fault condition requiring inspection. This program also sets a variable to prevent a double exposure over the previous picture. Finally, this program also determines if a lapse photography procedure is required and will remain until completed.

FIG. 23 illustrates the main program with starting point Z mentioned in connection with the jump table in FIG. 17. This program can be used to determine if a particular type of microscope is selected and if so it then can find out what camera format has been selected and obtain the proper data. It also can check if a 35 mm camera is selected and if so, check if the right camera data is displayed for that camera number. It also can determine if a manual or memorized time is selected and if so, cause the display to flash the time value showing that the automatic time determining program is not being called. The portion of the main program illustrated in FIG. 23 determines when to call the program to measure the light level from the photocell. No exposure may be in progress and no data field may be open, since keyboard inputs will affect the time displayed. The time determination indicated in FIG. 23 is arbitrary and depends upon how often it is desired to measure the light. For example, it can be every one second for normal light levels and every two seconds for low light levels.

Figure 24:
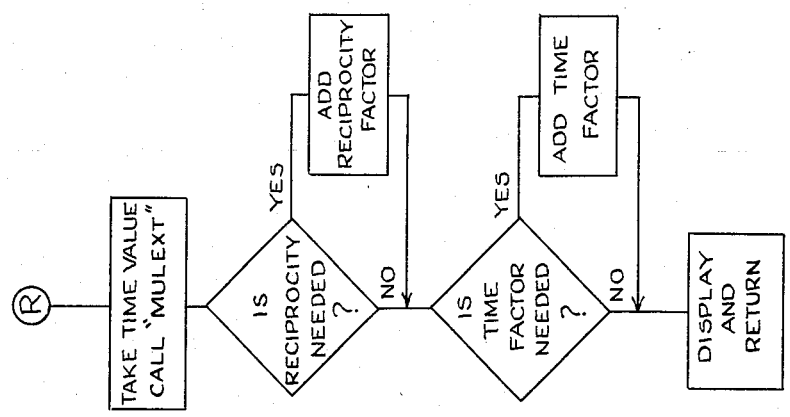
Figure 24:
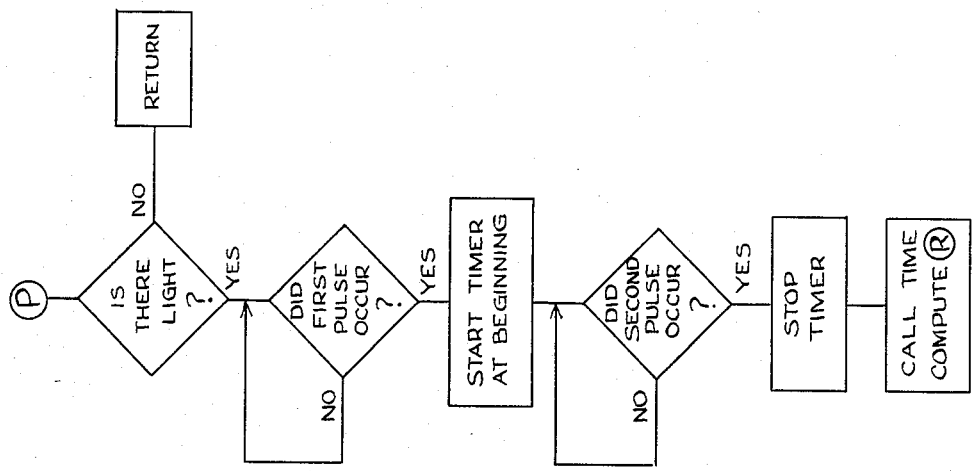

The program called to measure light level is illustrated in FIG. 24 with the starting point designated P. It measures light in the optical path of the apparatus which ultimately will expose the film. As previously described, this is the light from source 23 in FIG. 1 which travels through the specimen slide and the optical path of microscope 12 and which is directed by mirror 506 into tube 504 containing the photocell of light-to-frequency converter 316. As indicated in FIG. 24 the program first determines if light is on the photocell, and as previously described this is done by determining the presence of an RST 7.5 interrupt on microprocessor 150, which would occur in response to a pulse from converter 316 present on line 196. The program then determines if the first pulse from converter 316 has occurred and if so it starts the timer in component 280 of FIG. 7 as previously described. When the second pulse from converter 316 occurs the program stops that timer and calls a program to compute the exposure time. That program has the starting point designated R in FIG. 24 and now will be described presently.

Briefly, as shown in FIG. 24, the program takes the time value and calls the extended multiplication routine shown in FIG. 23 with the starting point N and previously described, if reciprocity and time factors are needed they are added or indicated, and the computed exposure time is displayed. In particular, the program determines the value of the total counts from component 280 in FIG. 7 by multiplying the variable TIMER OVERFLOW by 3000 and adding the leftover counts in the timer, i.e. register, of component 280. If TIMER OVERFLOW exceeds 20, then the multiplication by 3000 will exceed address variable size. In this case, TIMER OVERFLOW is first multiplied separate from multiplication by 3000 and the counter value is ignored. This product is divided by 65536 or right shift 16 bits. Then a selected correction value is applied to get the correct time value. The correction value will be determined from a look up table selected from the first reciprocity number and whether the high or low frequency was selected. This value obtained will then multiply the total product obtained and then divide the whole result by 65336, i.e. right shift by 16 bits, to obtain a whole number indicating time in milliseconds. The total time computation is summarized as follows:

$$\text{Counts} = \text{Format Multiplier} \quad \text{Film speed Multiplier} \quad \frac{\text{Light Pulses}}{65536}$$

$$\text{Time (hundreth seconds)} = (\text{counts}) \frac{(\text{correction})}{65536}$$

The following program is used to compute the reciprocity correction needed for the computed exposure time. The scale is selected by using the right hand digit of the reciprocity number displayed and the value of time needed is determined by computing a second order polynomial. If scale 0 is selected, then no reciprocity is desired and the program simply returns. The equation is as follows:

$$\text{TIME} = A0*X*X + A1*X + A2$$

Where time is the corrected time after reciprocity and X is the computed time prior to reciprocity correction. The coefficients A0, A1 and A2 are determined by the scale selection.

To obtain the time before exposure the program will look at PRODUCT*MID, previously defined in connection with the extended multiplication. Here the time is ten times the displayed time. The reciprocity correction will only be needed if the time exceeds more than 0.1 seconds. The program will first look at the value of PRODUCT*MID and if it is less 1 or 0.1 seconds the program simply will return since to reciprocity is needed. The program will determine the time first and then determine if it is greater than 10 seconds or if PRODUCT*MID is greater than 100. If so, a variable will be set to 10 to select an upper reciprocity curve valid from 10 seconds and larger.

It is therefore apparent that the present invention accomplishes its intended objects. Which an embodiment of the present invention has been described in detail, this is done for the purpose of illustration, not limitation.

I claim:

1. An exposure and camera control system comprising:
    (a) means for providing information relating to film parameters and camera type;
    (b) light to frequency converter means for providing pulse signals having a frequency proportional to the intensity of light to be used in exposing camera film; and (c) control means operatively connected to said information providing means and to said light to frequency converter means for calculating exposure time and for providing signals for controlling film exposure to light and signals for controlling film transport when the exposure is complete.

2. Apparatus according to claim 1, wherein said control means comprises digital information processing means, storage means and input/output interface means.

3. Apparatus according to claim 1, further including display means operatively connected to said information providing means and to said control means for providing visual display of said input information and of calculated quantities.

4. Apparatus according to claim 1, further including printer means operatively connected to said control means for providing a hard copy record of said input information and of calculated quantities.

5. Apparatus according to claim 1, further including:
(a) light sampling means normally positioned in the path of light to be used in exposing the film for directing the light to said light to frequency converter means; and
(b) means connected to said light sampling means and to said control means for moving said sampling means out of the light path prior to exposure of the film whereby all of the light in the path is available for exposing the film.

6. Apparatus according to claim 1, wherein a camera is operatively associated with said system and further including:
(a) means including an electric motor for advancing film in said camera frame-to-frame during exposure; and
(b) means operatively connected to said motor and to said control means for causing controlled operation of said motor for advancing the film.

7. Apparatus according to claim 1, wherein a camera is operatively associated with said system and further including:
(a) means in said camera for advancing the film frame-to-frame during exposure; and
(b) sensing means in said camera and operatively connected to said control means for providing signals indicative of the extent of film advance.

8. Apparatus according to claim 1, wherein a camera is operatively associated with said system and further including sensing means in said camera and operatively connected to said control means for providing a signal to said control means indicating when a new roll of film is placed in said camera.

9. Apparatus according to claim 1, wherein a camera is operatively associated with said system and further including means operated by said camera for providing a signal to said control means having information relating to a charasteristic of said camera.

10. Apparatus according to claim 1, wherein a camera and a microscope are operatively associated with said system for making photomicrographs.

11. Apparatus according to claim 10, further including:
(a) controlled shutter means in the optical path between said microscope and said camera; and
(b) means operatively connected to said control means and to said shutter means for applying control signals to said shutter means for controlling film exposure time.

12. Apparatus according to claim 1, wherein said means for providing information comprises a keyboard having a first group of manually operated means for providing function information inputs and a second group of manually operated means for providing numerical information inputs.

13. Apparatus according to claim 1, wherein said light to frequency converter means comprises:
(a) a voltage to frequency converter with an integrater in the feedback loop thereof; and
(b) a photocell connected to the summing junction associated with the converter and feedback loop.

14. Apparatus according to claim 13, further including means operatively connected to said control means and to said converter means for selecting an increased frequency output thereof in response to low intensity light.

15. Apparatus according to claim 14, wherein said photocell is of the silicon type.

* * * * *